US007853088B2

(12) United States Patent
Sakazume et al.

(10) Patent No.: US 7,853,088 B2
(45) Date of Patent: Dec. 14, 2010

(54) MOVING-PICTURE LAYERED CODING AND DECODING METHODS, APPARATUSES, AND PROGRAMS

(75) Inventors: Satoru Sakazume, Kanagawa-Ken (JP); Kazuhiro Shimauchi, Kanagawa-Ken (JP); Toru Kumakura, Kanagawa-Ken (JP); Motoharu Ueda, Kanagawa-Ken (JP)

(73) Assignee: Victor Company of Japan, Ltd., Yokohama-Shi, Kanagawa-Ken (JP)

( * ) Notice: Subject to any disclaimer, the term of this patent is extended or adjusted under 35 U.S.C. 154(b) by 1051 days.

(21) Appl. No.: 11/564,281

(22) Filed: Nov. 28, 2006

(65) Prior Publication Data

US 2007/0140350 A1 Jun. 21, 2007

(30) Foreign Application Priority Data

Nov. 28, 2005 (JP) ............................. 2005-341502
Nov. 24, 2006 (JP) ............................. 2006-317155

(51) Int. Cl.
*G06K 9/36* (2006.01)
*G06K 9/46* (2006.01)
*G06K 9/40* (2006.01)
*G06K 9/54* (2006.01)
*G06K 9/60* (2006.01)
*G06T 9/00* (2006.01)
*H04N 7/12* (2006.01)
*H04N 1/32* (2006.01)
*H04N 11/04* (2006.01)

(52) U.S. Cl. ........................ 382/232; 382/233; 382/240; 382/263; 382/302; 345/555; 348/384.1; 358/426.01; 375/240.21

(58) Field of Classification Search ................... 382/232
See application file for complete search history.

(56) References Cited

U.S. PATENT DOCUMENTS 4,268,861 A * 5/1981 Schreiber et al. .......... 375/240.1
5,798,796 A * 8/1998 Sugiyama .............. 375/240.04
7,519,118 B2 * 4/2009 Lin et al. ............... 375/240.25

FOREIGN PATENT DOCUMENTS

EP       0644695 A2   3/2002

(Continued)

OTHER PUBLICATIONS

"An Arbitrary Scale Image Enlargement Method with the Prediction of High-Frequency Components", Yasumasa Takahashi and Akira Taguchi, The Institute of Electronics, Information and Communication Engineers, vol. J84-A, No. 9, pp. 1192-1201, Sep. 2001. English translation of Abstract provided.

(Continued)

*Primary Examiner*—Matthew C Bella
*Assistant Examiner*—Jose M Torres
(74) *Attorney, Agent, or Firm*—Jeffer Mangels Butler & Mitchell LLP

(57) ABSTRACT

An input video signal is encoded at a plurality of coding layers exhibiting different spatial resolutions. Decoded is a given signal coded at a lower coding layer lower than a specific coding layer among the plurality of coding layers to generate a decoded signal of the lower coding layer. Spatial interpolation is applied to the decoded signal of the lower coding layer to generate an upscaled decoded video signal. The spatial interpolation is an upscaling procedure to upscale the decoded signal of the lower coding layer into a spatial resolution of the specific coding layer. A spatial high-frequency components estimation and scale up procedure is applied to the decoded signal of the lower coding layer to generate a high-frequency components signal. The upscaled decoded video signal and the high-frequency components signal are subtracted from the input video signal exhibiting a spatial resolution of the specific coding layer to produce a predictive-error signal. Then, the predictive-error signal is encoded at the specific coding layer to generate an output bitstream. The decoding, spatial interpolating, spatial high-frequency components estimating and upscaling, and encoding procedures are executed at, at least, the specific coding layer among the plurality of coding layers except the lowest coding layer exhibiting the lowest spatial resolution thereamong.

10 Claims, 14 Drawing Sheets

FOREIGN PATENT DOCUMENTS

| JP | 08-186827 | 7/1996 |
| JP | 08-294001 | 11/1996 |
| JP | 2001-008027 | 1/2001 |

OTHER PUBLICATIONS

"Image Enhancement by Nonlinear Extrapolation in Frequency Space", Hayit Greenspan, Charles H. Anderson, and Sofia Akber, IEEE Transactions on Image Processing, vol. 9, No. 6, pp. 1035-1048, Jun. 2000.

"Improved Prediction and Transform for Spatial Scalability", G. Rath, C. Guillemot, W. Yang, V. Bottreau, JVT (Joint Video Team) 20th Meeting, Klagenfurt, Austria, JVT-T082, Jul. 15-21, 2006. Presentation slides and article.

* cited by examiner

US 7,853,088 B2

MOVING-PICTURE LAYERED CODING AND DECODING METHODS, APPARATUSES, AND PROGRAMS

CROSS-REFERENCE TO RELATED APPLICATIONS

This application is based on and claims the benefit of priority from the prior Japanese Patent Application Nos. 2005-341502 filed on Nov. 28, 2005 and 2006-317155 filed on Nov. 24, 2006, the entire contents of which are incorporated herein by reference.

BACKGROUND OF THE INVENTION

The present invention relates to layered coding and decoding methods, apparatuses, and programs for moving pictures based on spatial- and time-domain and also interlayer correlation.

Several spatial- and time-domain resolution and SNR (Signal-to-Noise) scalable video coding schemes have been proposed and employed in a variety of fields. In particular, spatial-domain resolution scalable video coding schemes are most applicable to still and moving pictures.

A spatial-domain resolution scalable layered video coding scheme produces interlayer predictive signals for use in coding enhancement layers that exhibit higher spatial resolutions than base layers also to be coded. The interlayer predictive signals are produced through enhancement-layer motion compensation and time domain prediction with base-layer spatial decimation and interpolation.

The known layered video coding scheme, however, suffers elimination of high-frequency components, that are required in production of interlayer predictive signals, through base-layer spatial decimation.

In detail, the layered video coding scheme employs interframe prediction in enhancement-layer coding based on correlation between video frames subjected to enhancement-layer coding and locally decoded frames produced in decoding of base-layer coded frames.

In this procedure, high-frequency components, like those carried by video frames to be subjected to enhancement-layer coding, are eliminated from video frames subjected to base-layer coding. The elimination may occur due to limited bandwidth in production of base-layer frames with a spatial scale down procedure. It may also occur through a coding procedure, e.g., quantization, when such high-frequency components are treated as less important components through base-layer coding.

The elimination of high-frequency components results in insufficient predictive coding to produce inaccurate enhancement-layer predictive frames based on correlation between enhancement and base layers. This mostly occurs for zones in a video frame that carries high-frequency components continuously, such as, an edge portion, due to the problem in that such high-frequency components are eliminated from video frames subjected to base-layer coding, as discussed above.

Even when predictive coding is done (although insufficiently) in spite of elimination of such high-frequency components through base-layer spatial decimation, another problem arises in which enhancement-layer predictive-coded frames carrying high-frequency components suffer increase in signal level or data amount, especially, for zones in a video frame that carries high-frequency components continuously, compared to zones that mainly carry low-frequency components.

SUMMARY OF THE INVENTION

A purpose of the present invention is to provide layered coding and decoding methods, apparatuses, and programs with accurate interframe predictive coding with a smaller data amount.

The present invention provides a layered coding apparatus for encoding an input video signal at a plurality of coding layers exhibiting different spatial resolutions comprising: a decoder to decode a given signal coded at a lower coding layer lower than a specific coding layer among the plurality of coding layers, thus generating a decoded signal of the lower coding layer; a spatial interpolator to apply spatial interpolation to the decoded signal of the lower coding layer, thus generating an upscaled decoded video signal, the spatial interpolation being an upscaling procedure to upscale the decoded signal of the lower coding layer into a spatial resolution of the specific coding layer; a spatial high-frequency components estimator and upscaler to apply a spatial high-frequency components estimation and scale up procedure to the decoded signal of the lower coding layer, thus generating a high-frequency components signal; and an encoder to subtract the upscaled decoded video signal and the high-frequency components signal from the input video signal exhibiting a spatial resolution of the specific coding layer to produce a predictive-error signal, and encode the predictive-error signal at the specific coding layer, thus generating an output bitstream, wherein the decoder, the spatial interpolator, the spatial high-frequency components estimator and upscaler, and the encoder function at, at least, the specific coding layer among the plurality of coding layers except the lowest coding layer exhibiting the lowest spatial resolution thereamong.

Moreover, the present invention provides a layered decoding apparatus for decoding an input bitstream comprising: a spatial interpolator to apply spatial interpolation to a given signal decoded at a lower decoding layer lower than a specific decoding layer, thus generating an upscaled decoded video signal, the spatial interpolation being an upsealing procedure to upscale the given decoded signal into a spatial resolution of the specific decoding layer; a spatial high-frequency components estimator and upscaler to apply a spatial high-frequency components estimation and scale up procedure to the given decoded signal at the lower decoding layer, thus generating a high-frequency components signal; and a decoder to decode the input bitstream to obtain a predictive error-signal and add the upscaled decoded video signal and the high-frequency components signal to the predictive-error signal, thus generating a reproduced video signal, wherein the spatial interpolator, the spatial high-frequency components estimator and upscaler, and the decoder function at the specific decoding layer that corresponds to at least one specific coding layer among a plurality of coding layers exhibiting different spatial resolutions except the lowest coding layer exhibiting the lowest spatial resolution thereamong, wherein the input bitstream has been obtained by encoding a predictive-error signal at, at least, the specific coding layer, the predictive-error signal being obtained by subtracting an upscaled decoded video signal and a high-frequency components signal from a video signal exhibiting a spatial resolution of the specific coding layer, the upscaled decoded video signal having been obtained by applying spatial interpolation to a signal decoded at a lower coding layer lower than the specific coding layer, the spatial interpolation being an upscaling procedure to upscale the signal decoded at the lower coding layer into a spatial resolution of the specific coding layer, and the high-frequency components signal having been obtained by applying a spatial high-frequency components estimation and scale up procedure to the signal decoded at the lower coding layer.

DETAILED DESCRIPTION OF PREFERRED EMBODIMENTS

Several preferred embodiments according to the present invention will be described in detail with reference to the drawings.

The same reference signs and numerals are used for the same or analogous components through the drawings in the following disclosure.

Figure 1:
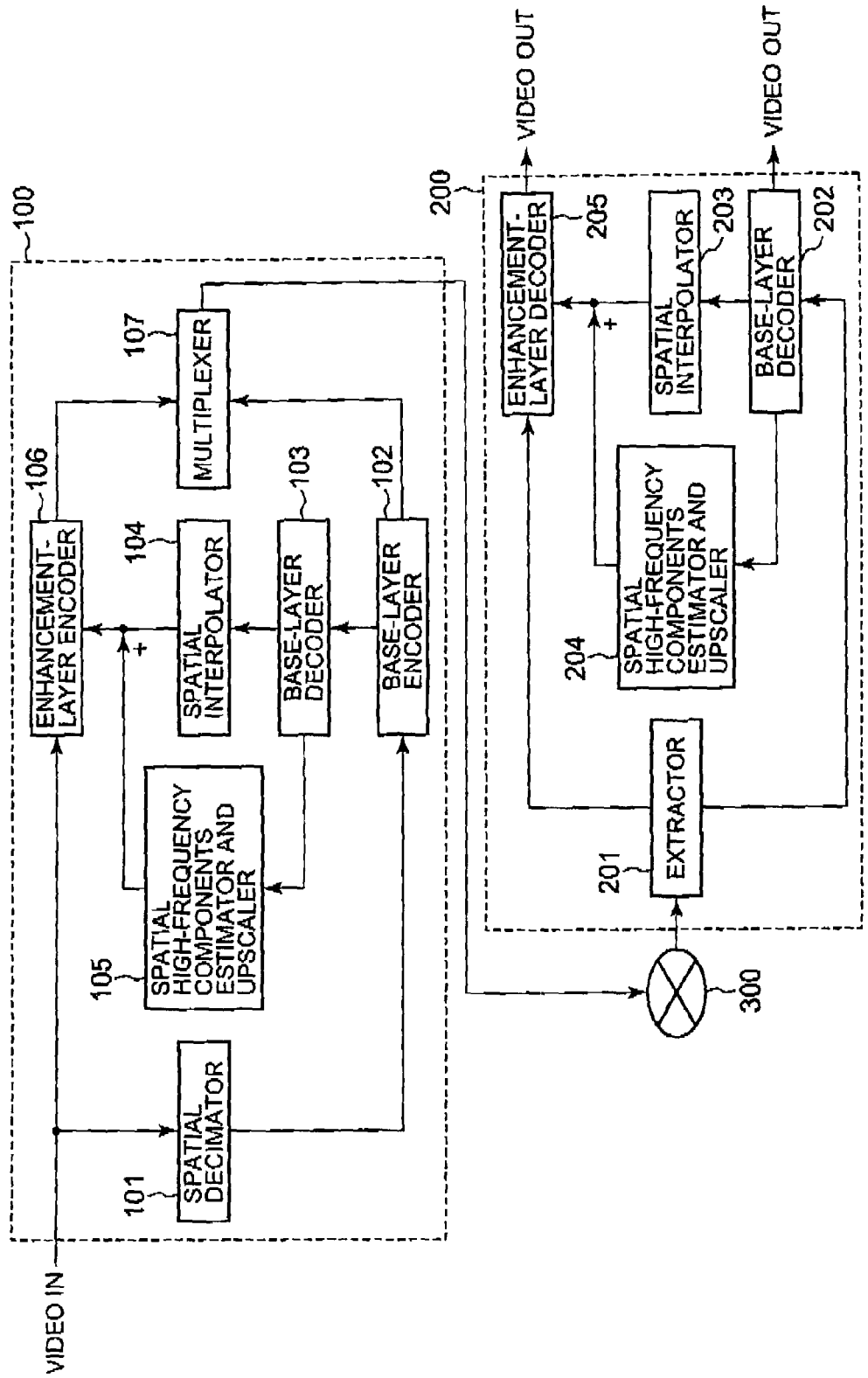
FIG. 1 shows block diagrams of a layered coding apparatus and a layered decoding apparatus according to the present invention.
Figure 2:
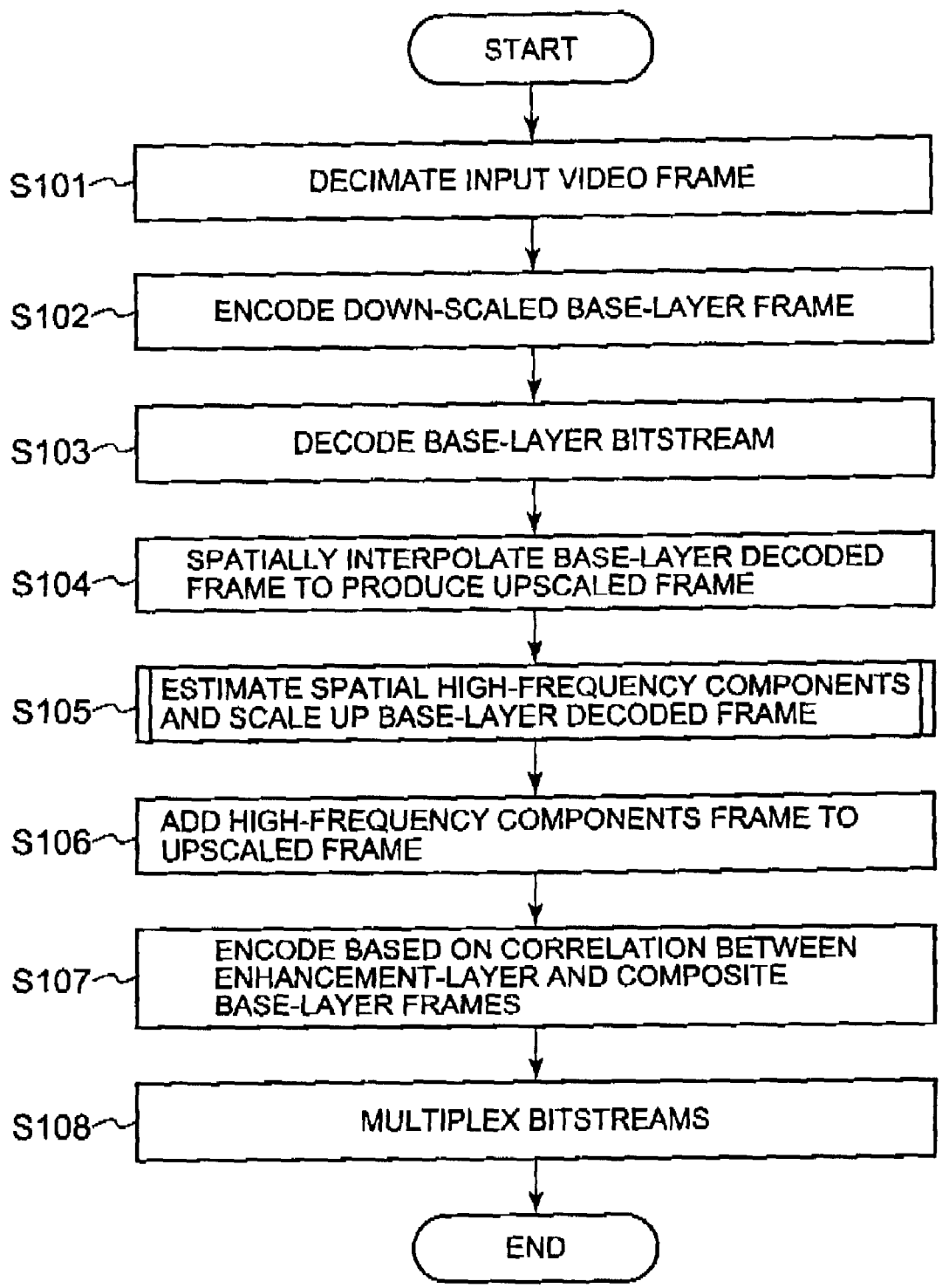
FIG. 2 shows a flowchart of a layered coding procedure executed by the layered coding apparatus shown in FIG. 1.
Figure 3:
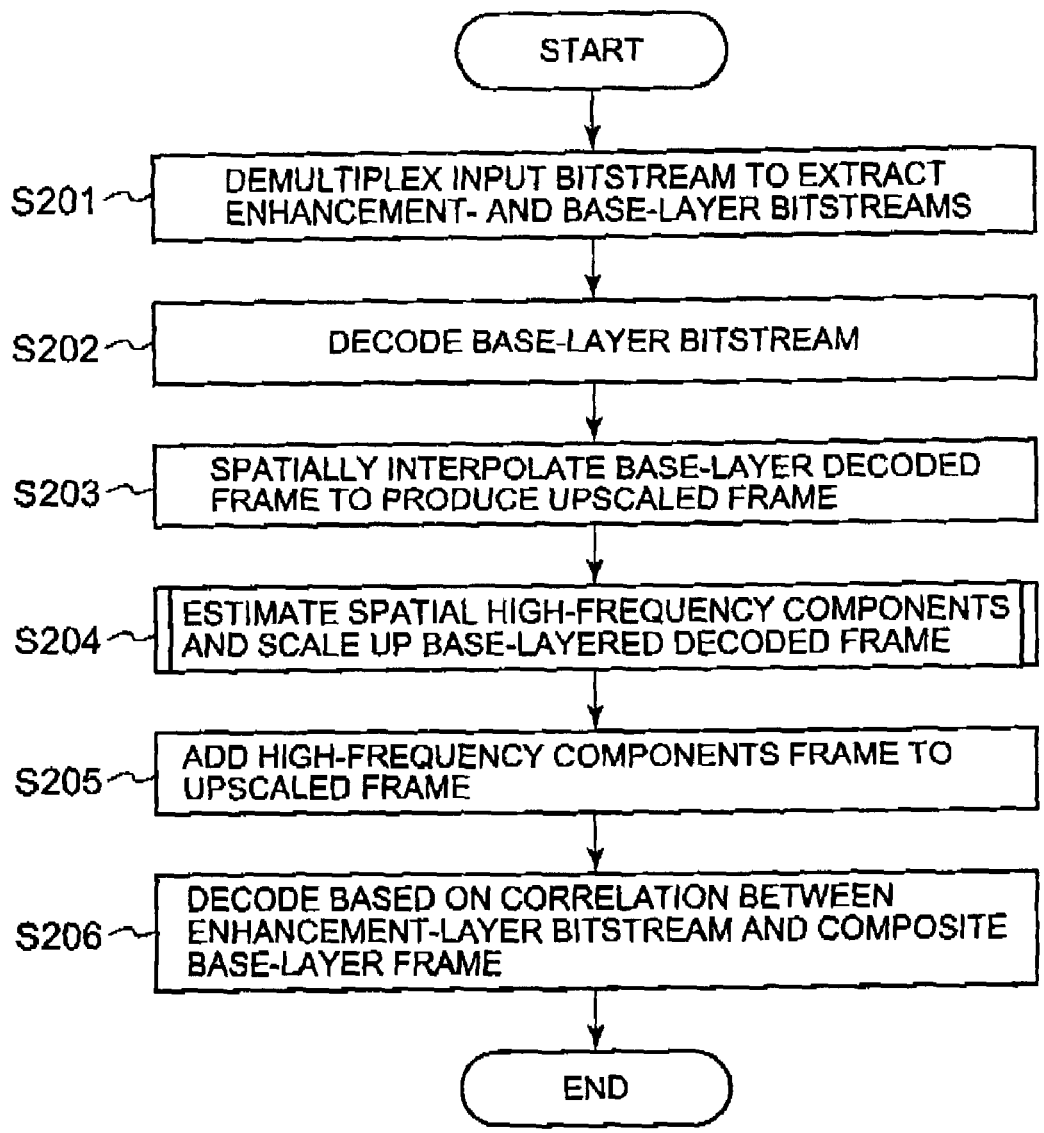
FIG. 3 shows a flowchart of a layered decoding procedure executed by the layered decoding apparatus shown in FIG. 1.

Described first with reference to FIGS. 1 to 3 are layered coding and decoding apparatuses according to the present invention.

Shown in FIG. 1 are block diagrams of a layered coding apparatus 100 and a layered decoding apparatus 200.

The layered coding apparatus 100 is electrically connected to the layered decoding apparatus 200 via a transfer cable or other media 300. Input to the layered coding apparatus 100 is a video signal carrying moving pictures. The video signal is subjected to a coding procedure at the coding apparatus 100.

Output from the layered coding apparatus 100 is a bitstream which is then supplied to the layered decoding apparatus 200 via the transfer cable or media 300. Data necessary for a decoding procedure are extracted from the bitstream and subjected to the procedure at the decoding apparatus 200. A decoded video signal is output from the apparatus 200 at a spatial resolution and a frame rate suitable for a display apparatus (not shown).

Not only from the layered coding apparatus 100, the layered decoding apparatus 200 can receive bitstream from any source.

The layered coding apparatus 100 is equipped with, at least, a spatial decimator 101 (for spatial scale down), a base-layer encoder 102, a base-layer decoder 103, a spatial interpolator 104 (for spatial scale up), a spatial high-frequency components estimator and upscaler 105, an enhancement-layer encoder 106, and a multiplexer 107.

The function of each unit of the layered coding apparatus 100 will be described with reference to the block diagram shown in FIG. 1 and also a flowchart shown in FIG. 2.

The spatial decimator 101 receives enhancement-layer picture element signals that carry enhancement-layer video frames (or fields in option) involved in the input moving-picture video signal. The video frames exhibit a spatial resolution for enhancement-layer coding. The decimator 101 decimates each video frame in spatial resolution (step S101) or scales down the video frame, thus producing a decimated (down-scaled) base-layer video frame. The base-layer video frame exhibits a spatial resolution lower than that of the input video signal. In other words, the base-layer video frame exhibits a spatial resolution lower than for enhancement-layer coding, so as to be subjected to base-layer coding. It is preferable for the spatial scale down procedure to include spatial bandwidth limitation to suppress spatial aliasing. The base-layer video frame for base-layer coding is then supplied to the base-layer encoder 102.

The base-layer encoder 102 performs base-layer coding to the down-scaled base-layer video frame (step S102), thus generating a base-layer bitstream which is then supplied to the base-layer decoder 103 and the multiplexer 107. The base-layer coding at the base-layer encoder 102 may be any base-layer coding technique based on correlation in both of the spatial and time domains. In other words, the encoder 102 may be equipped, at least, with circuitry for motion estimation, motion compensation, orthogonal transform, quantization, inverse orthogonal transform, dequantization, entropy coding, etc., under MPEG standards for example, based on frame correlation in the spatial and time domains.

The base-layer decoder 103 decodes the base-layer bitstream generated by the base-layer encoder 102 (step S103), thus generating a base-layer decoded video frame (a locally decoded signal). Decoding of the base-layer bitstream can be done with any known decoding technique. The base-layer decoded frame is then supplied to the spatial interpolator 104 and the spatial high-frequency components estimator and upscaler 105.

The spatial interpolator 104 applies a spatial interpolation (scale up) procedure to the base-layer decoded video frame (locally decoded signal), thus generating an upscaled video frame (step S104). The upscaled video frame exhibits a spatial resolution corresponds to that before the scale-down procedure at the spatial decimator 101, or to the spatial resolution of the enhancement layer which is one layer higher than the base layer. It is preferable for the scale up procedure to the base-layer decoded video frame to compensate the lack of pixels in the spatial domain with those of the decoded frame using an interpolation function, such as, a sync function.

The spatial high-frequency components estimator and upscaler 105 applies a spatial high-frequency components estimation and scale-up procedure, in a specific direction in the spatial domain, to the base-layer decoded frame supplied by the base-layer decoder 103 (step S105). Moreover, based on the spatial high-frequency components estimation and scale-up procedure, the estimator and upscaler 105 generates a high-frequency components frame that carries estimated high-frequency components. The estimated high-frequency components correspond to a video frame that exhibits a spatial resolution before subjected to the scale-down procedure at the spatial decimator 101.

The high-frequency components frame generated by the spatial high-frequency components estimator and upscaler 105 is then added to or mixed with the upscaled video frame generated by the spatial interpolator 104 (step S106), thus a composite base-layer high-frequency-components estimated video frame being generated. The composite base-layer high-frequency-components-estimated video frame is then supplied to the enhancement-layer encoder 106. Or, the frames generated by the estimator and upscaler 105 and the interpolator 104 may be separately supplied to the encoder 106.

The enhancement-layer encoder 106 receives: each enhancement-layer video frame carried by the input moving-picture video signal; and the composite base-layer high-frequency-components-estimated video frame (or, the high-frequency components frame and the upscaled video frame). The encoder 106 performs an enhancement-layer coding procedure based on correlation between the enhancement-layer video frame and the composite base-layer video frame (step S107), thus generating a bitstream which is then supplied to the multiplexer 107.

In other words, the enhancement-layer encoder 106 performs: a prediction procedure between the enhancement-layer video frame (exhibiting a spatial resolution of the enhancement layer) and the composite base-layer high-frequency-components-estimated video frame (or, the upscaled video frame from the spatial interpolator 104 and the high-frequency components frame from the spatial high-frequency components estimator and upscaler 105); and an encoding procedure to encode a predictive-error signal obtained by subtracting the composite video frame (or, the upscaled and high-frequency components frames) from the enhancement-layer video frame.

As disclosed above, the enhancement-layer encoding procedure in FIG. 1 has the following advantages: In known enhancement-layer encoding technology, a predictive-error signal to be coded is given by subtracting an upscaled video frame from an enhancement-layer video frame. On the contrary, in FIG. 1, subtracted from the enhancement-layer video frame is not only the upscaled video frame but also the high-frequency components video frame generated by estimation and upscaling, as described above. This predictive encoding procedure gives smaller predictive errors to high-frequency components, and hence gives smaller amounts to bitstream thus encoded, compared to the known enhancement-layer encoding.

The enhancement-layer coding at the enhancement-layer encoder 106 may be any enhancement-layer coding technique based on correlation in both of the spatial and time domains and also between the layers. In other words, the encoder 106 may be equipped, at least, with circuitry for motion estimation, motion compensation, orthogonal transform, quantization, inverse orthogonal transform, dequantization, entropy coding, etc., under MPEG standards for example, based on frame correlation in the spatial and time domains and also between the layers. Accordingly, it is preferable for the encoder 106 to apply the motion estimation and motion compensation procedure to the enhancement-layer video frame using the composite base-layer high-frequency-components-estimated video frame as a reference frame, for higher coding efficiency.

The multiplexer 107 multiplexes the bistreams supplied by the base-layer encoder 102 and the enhancement-layer encoder 106 (S108), thus generating an embedded multiplexed bistream which is then output via the transfer cable or media 300.

Disclosed above are the function of each unit of the layered coding apparatus 100 (FIG. 1) and also the several steps in the layered coding procedure (FIG. 2) performed by the apparatus 100.

Disclosed next is the layered decoding apparatus 200 shown in FIG. 1. The apparatus 200 is equipped with, at least, an extractor 201, a base-layer decoder 202, a spatial interpolator 203, a spatial high-frequency components estimator and upscaler 204, and an enhancement-layer decoder 205.

The function of each unit of the layered decoding apparatus 200 will be described with reference to the block diagram shown in FIG. 1 and also a flowchart shown in FIG. 3.

The extractor 201 receives the embedded multiplexed bistream output from the layered coding apparatus 100 via the transfer cable or media 300. Not only from the apparatus 100, the layered decoding apparatus 200 can receive bitstream from any source. The extractor 201 demultiplexes the embedded multiplexed bistream and extracts a base-layer bitstream and an enhancement-layer bitstream (step S201) which are then supplied to the base-layer decoder 202 and the enhancement-layer decoder 205, respectively.

The base-layer decoder 202 decodes the base-layer bitstream supplied from the extractor 201 (step S202), thus generating a base-layer decoded video frame (a locally decoded signal). The base-layer decoded video frame is then supplied to the spatial interpolator 203 and the spatial high-frequency components estimator and upscaler 204, and, if necessary, to a display apparatus (not shown).

As already mentioned, the base-layer coding at the base-layer encoder 102 of the layered coding apparatus 100 may be any base-layer coding technique based on correlation in both of the spatial and time domains. Thus, the base-layer decoding at the base-layer decoder 202 can be any base-layer decoding technique to accurately decode the bitstream generated by the encoder 102.

In this regard, also already mentioned, the base-layer encoder 102 may be equipped, at least, with circuitry for motion estimation, motion compensation, orthogonal transform, quantization, inverse orthogonal transform, dequantization, entropy coding, etc., under MPEG standards for example, based on frame correlation in the spatial and time domains.

In order to be compatible with the base-layer encoder 102, the base-layer decoder 202 may be equipped, at least, with circuitry for motion compensation, inverse orthogonal transform, dequantization, entropy decoding, etc., under MPEG standards for example, to accurately decode the base-layer bitstream.

The spatial interpolator 203 applies a spatial interpolation (scale up) procedure to the base-layer decoded video frame (locally decoded signal) supplied from the base-layer decoder 202, thus generating an upscaled video frame (step S203) which is then supplied to the enhancement-layer decoder 205. The upscaled video frame exhibits a spatial resolution corresponds to that before the scale-down procedure at the spatial decimator 101 of the layered coding apparatus 100, or to the spatial resolution of the enhancement layer which is one layer higher than the base layer. It is preferable for the scale up procedure to the base-layer decoded video frame to compensate the lack of pixels in the spatial domain with those of the decoded frame using an interpolation function, such as, a sync function.

The spatial high-frequency components estimator and upscaler 204 applies high-frequency components estimation and scale-up procedure, in a specific direction in the spatial domain, to the base-layer decoded frame supplied by the base-layer decoder 202 (step S204). Moreover, based on the high-frequency components estimation and scale-up procedure, the estimator and upscaler 204 generates a high-frequency components frame that carries estimated high-frequency components. The estimated high-frequency components correspond to a video frame that exhibits a spatial resolution before subjected to the scale-down procedure at the spatial decimator 101 of the layered coding apparatus 100.

The high-frequency components frame generated by the spatial high-frequency components estimator and upscaler 204 is then added to or mixed with the upscaled video frame generated by the spatial interpolator 203 (step S205), thus a composite base-layer high-frequency-components estimated video frame being generated. The composite base-layer high-frequency-components-estimated video frame is then supplied to the enhancement-layer decoder 205. Or, the frames generated by the estimator and upscaler 204 and the interpolator 203 may be separately supplied to the decoder 205.

The enhancement-layer decoder 205 receives: the enhancement-layer bitstream from the extractor 201; and the composite base-layer high-frequency-components-estimated video frame (or, the high-frequency components frame and the upscaled video frame). The decoder 205 performs an enhancement-layer decoding procedure based on correlation between the enhancement-layer bitstream and the composite base-layer high-frequency-components-estimated video frame (step S206), thus generating an enhancement-layer decoded video frame (a decoded video signal).

As disclosed above, the multiplexed bitstream input to the layered decoding apparatus 200 includes the bitstream which is the encoded predictive-error signal given, in the layered coding apparatus 100, by subtracting the composite base-layer high-frequency-components-estimated video frame (or, the upscaled video frame from the spatial interpolator 104 and the high-frequency components frame from the spatial high-frequency components estimator and upscaler 105).

Therefore, the enhancement-layer decoder 205 in the layered decoding apparatus 200 performs the enhancement-layer decoding procedure to decode the enhancement-layer bitstream to gain a predictive-error signal and adds this signal and the composite base-layer high-frequency-components-estimated video frame (or, the high-frequency components frame from the spatial high-frequency components estimator and upscaler 204 and the upscaled video frame from the spatial interpolator 203), thus generating an enhancement-layer decoded video frame.

Accordingly, the layered decoding apparatus 200 can accurately perform the decoding procedure even when the bitstream input thereto includes the bitstream which is the encoded predictive-error signal given, in the layered coding apparatus 100, by subtracting the composite base-layer high-frequency-components-estimated video frame (or, the upscaled video frame from the spatial interpolator 104 and the high-frequency components frame from the spatial high-frequency components estimator and upscaler 105).

The enhancement-layer decoded video frame generated by the enhancement-layer decoder 205 is supplied to a display apparatus (not shown). The base-layer decoded frame generated by the base-layer decoder 202 may be supplied to the display apparatus together with or instead of the enhancement-layer decoded video frame.

The enhancement-layer decoding procedure at the enhancement-layer decoder 205 is compatible with the enhancement-layer coding procedure at the enhancement-layer encoder 106 of the layered coding apparatus 100.

Employed for the enhancement-layer decoding procedure at the enhancement-layer decoder 205 may be any decoding technique that accurately decodes the enhancement-layer bitstream generated by the enhancement-layer encoder 106.

In other words, the enhancement-layer decoder 205 may be equipped, at least, with circuitry for motion compensation, inverse orthogonal transform, dequantization, entropy decoding, etc., under MPEG standards for example, based on frame correlation in the spatial and time domains and also between the layers. Accordingly, it is preferable for the decoder 205 to be capable of applying the motion compensation procedure to the enhancement-layer video frame using the composite base-layer high-frequency-components-estimated video frame as a reference frame, for higher decoding efficiency.

Accordingly, the layered coding and decoding schemes according to the embodiment disclosed above focused on "a pyramidal structure" of high-frequency components generated in a zone in a video frame, such as, a strong edge zone. Such high-frequency components are eliminated before the coding procedure, which can be estimated from a base layer of the video frame based on correlation between the base layer and an enhancement layer (one layer higher than the base layer) of the video frame. Elimination of the high-frequency components can be done with the subtraction procedure, as discussed in step S107 of FIG. 2.

Elimination of the high-frequency components results in suppression of a signal level of an interlayer predictive signal obtained from the difference between the enhancement and base layers. The interlayer predictive signal exhibits higher correlation with other interlayer predictive signals obtained in the vicinity of the signal in the time domain as the signal level is suppressed further, thus entropy being suppressed.

Therefore, coded data (bitstream) carry fewer bits under the higher efficient coding scheme according to the embodiment disclosed above. In addition, the suppressed interlayer predictive signal level diminishes adverse effects to decoding due to quantization errors, according to the above embodiment.

Disclosed next is the spatial high-frequency components estimator and upscaler 105 included in the layered coding apparatus 100, whereas description is omitted for the spatial high-frequency components estimator and upscaler 204 included in the layered decoding apparatus 200 because the estimators and upscalers 105 and 204 are identical to each other.

Figure 4:
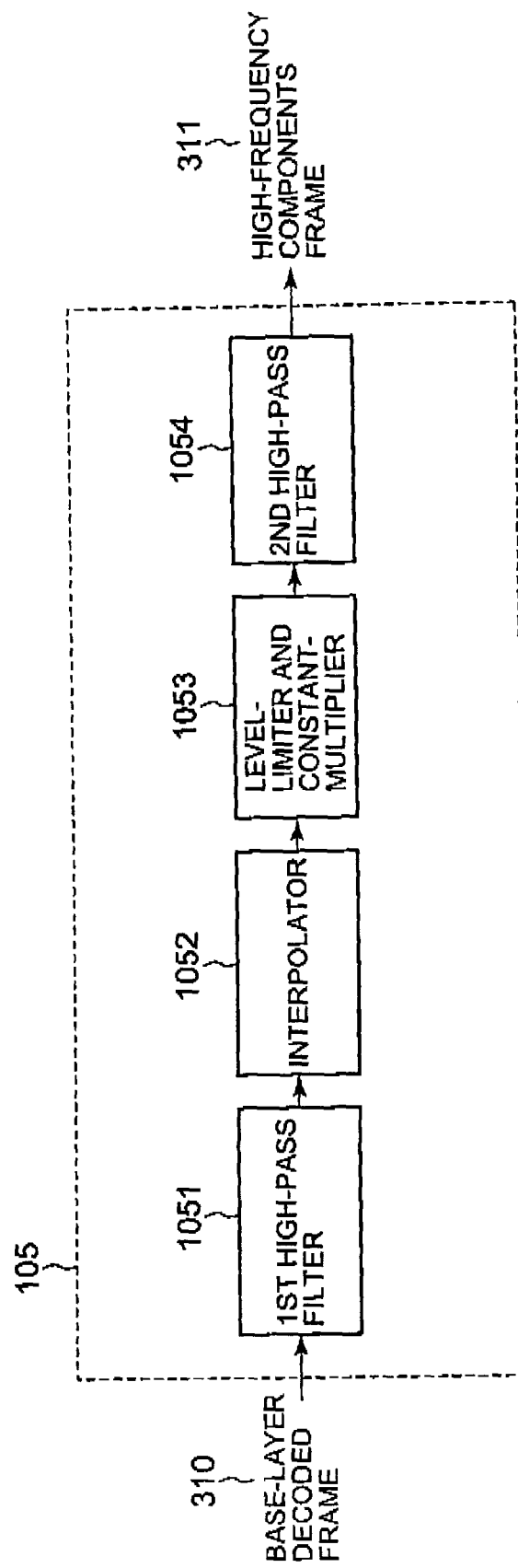
FIG. 4 shows a block diagram of a spatial high-frequency components estimator and upscaler shown in FIG. 1.

FIG. 4 shows a block diagram of the spatial high-frequency components estimator and upscaler 105 included in the layered coding apparatus 100.

The spatial high-frequency components estimator and upscaler 105 is equipped with, at least, a first high-pass filter 1051, an interpolator 1052, a level-limiter and constant-multiplier 1053, and a second high-pass filter 1054.

Figure 5:
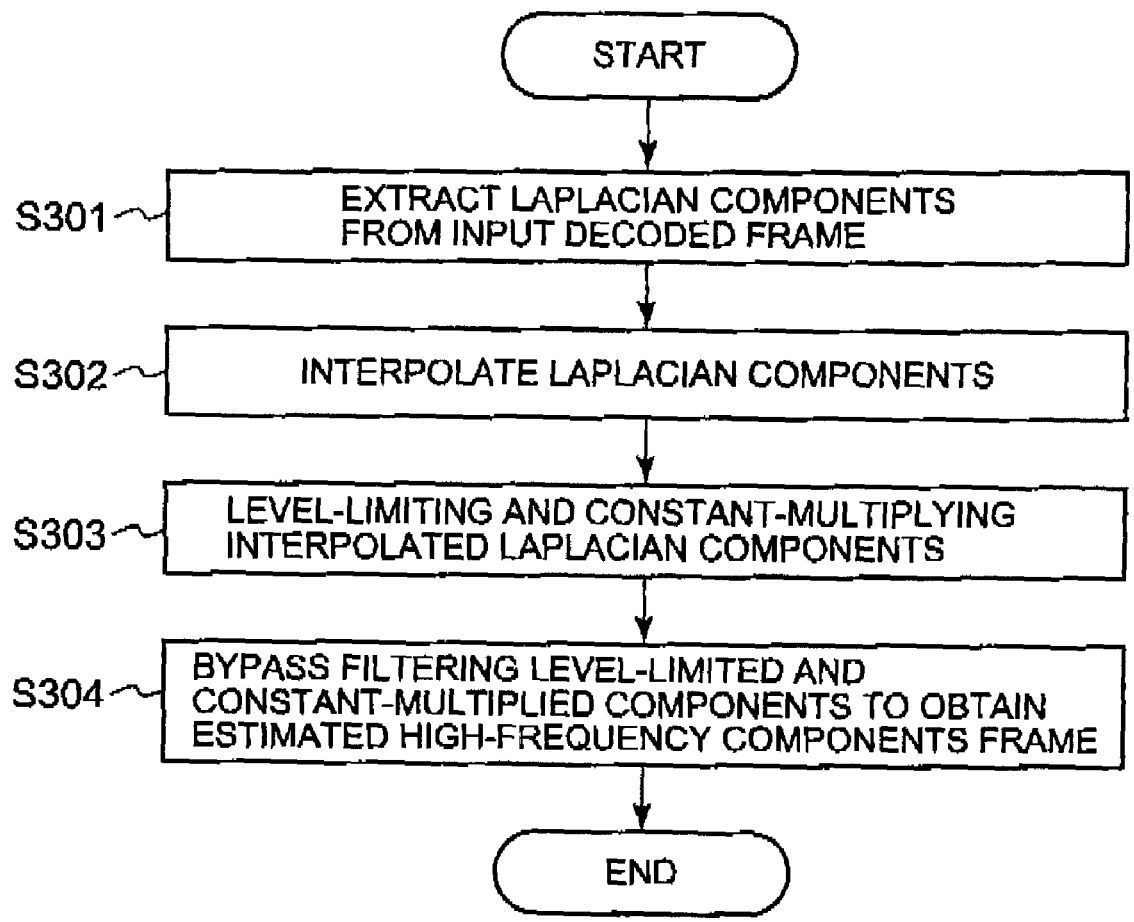
FIG. 5 shows a flowchart of a spatial high-frequency components estimating and upscaling procedure executed by the spatial high-frequency components estimator and upscaler shown in FIG. 1.

The function of each unit of the spatial high-frequency components estimator and upscaler 105 will be described with reference to the block diagram shown in FIG. 4 and also a flowchart shown in FIG. 5.

The first high-pass filter 1051 receives the base-layer decoded frame supplied from the base-layer decoder 103 (FIG. 1) and extracts specific high-frequency components from the base-layer decoded frame. The specific high-frequency components are those having a high correlation with high-frequency components carried by the enhancement-layer video frame to be coded (one layer higher than the base layer), hence suitable for use in estimation.

In this exemplary estimator and upscaler 105, the first high-pass filter 1051 receives an input decoded frame 310 to be upscaled and extracts Laplacian components for high-frequency components suitable for use in estimation (step S 301).

In the layered coding apparatus 100 that performs a coding procedure at two coding layers, the enhancement layer and the base layer, the input frame 310 is a base-layer decoded frame supplied from the base-layer decoder 103. However, as disclosed later, the present invention is also applicable to multilayer coding and decoding schemes that handle a base coding layer and an N number of enhancement coding layers (N being a positive integer of one or more). Under the multilayer schemes, the input frame 310 is an (N−1)-th enhancement-layer decoded frame to be used for coding an N-th enhancement-layer frame at one layer higher than the (N−1)-th enhancement-layer.

Laplacian components Lo(x) extracted from an input signal Go(x), as a one-dimensional signal model, can be expressed as follows:

$$L_o(x) = G_o(x) - \sum_{i=-I}^{I} W(i) \cdot G_o(x+i) \quad (1)$$

$$W(i) = \frac{1}{2\sqrt{\rho\pi}} e^{-\frac{i^2}{4\rho}} \quad (2)$$

The letters "I" and "ρ" in the expressions (1) and (2) are the number of filter taps and a parameter for use in examining a bandwidth of a Gaussion filter, set to a value for halfband filtering, respectively.

The extracted high-frequency components suitable for use in estimation, in this case, Laplacian components Lo(x), are supplied to the interpolator 1052.

The interpolator 1052 applies an interpolation procedure to the extracted high-frequency components, or Laplacian components Lo(x), at an enlargement scale (enhancement-layer spatial resolution/base-layer spatial resolution) for desired resolution (step S302).

The Interpolation procedure to the Laplacian components Lo(x) at an enlargement scale "r" (enhancement-layer spatial resolution/base-layer spatial resolution) can be expressed as follows:

$$(EXPAND)_r L_o(x) = \sum_{i=-I}^{I} w_r(i) L_o\left(\text{int}\left(\frac{x}{2r}\right) + i\right) \quad (3)$$

$$W_r(i) = \frac{3}{4} e^{-\frac{9\pi}{16}(\Delta k+i)^2} \quad (4)$$

$$\Delta k = \text{int}\left(\frac{x}{2r}\right) - \frac{x}{2r} \quad (5)$$

The letter "I" in the expression (3) is the number of filter taps. The sign "int(•)" in the expressions (3) and (5) indicates an integer extraction procedure.

An interpolated Laplacian-components signal (EXPAND)$_r$Lo(x) obtained through the interpolation procedure is then supplied to the level-limiter and constant-multiplier 1053.

The level-limiter and constant-multiplier 1053 applies a level-limiting and constant-multiplying procedure to the interpolated Laplacian-components signal (EXPAND)$_r$LO(x) (step S303). This procedure is a first step of estimating unknown high-frequency components from the signal (EXPAND)$_r$LO(x), which can be expressed as follows:

$$\overline{L_r}(x) = \alpha_r \times \begin{cases} T & \text{if } T \leq (EXPAND)_r L_o(x) \\ (EXPAND)_r L_o(x) & \text{if } -T < (EXPAND)_r L_o(x) < T \\ -T & \text{if } (EXPAND)_r L_o(x) \leq -T \end{cases} \quad (6)$$

The first step of high-frequency components estimation at the level-limiter and constant-multiplier 1053 according to the expression (6) is performed as follows:

The level-limiter and constant-multiplier 1053 outputs: a signal which is a result of constant-multiplying procedure to the interpolated Laplacian-components signal (EXPAND)$_r$Lo(x) with "$\alpha_r$" when the level of the signal (EXPAND)$_r$Lo(x) lies between given levels T and −T; a signal having a level of "$\alpha_r \cdot (T)$" when the level of the signal (EXPAND)$_r$Lo(x) is at or higher than T; and a signal having a level of "$\alpha_r \cdot (-T)$" when at or lower than −T. The levels T and −T are used in level limitation.

The expressions (1) to (6) are taught from the description of the document "An Arbitrary Scale Image Enlargement Method with the Prediction of High-Frequency Components" published by the Institute of Electronics, Information and Communication Engineers, Vol. J84-A, No. 9, pp. 1192-1201, September 2001, the entire content of which is incorporated herein by reference.

Experimentally obtained values shown in the document can be used as the parameters T and $\alpha_r$ for the level limitation and constant multiplication, respectively. The parameter $\alpha_r$ depends on the enlargement scale.

The level-limited and constant-multiplied signal is supplied from the level-limiter and constant-multiplier 1053 to the second high-pass filter 1054.

The second high-pass filter 1054 applies a second step of estimating unknown high-frequency components to the input level-limited and constant-multiplied signal. The second step is a high-pass filtering procedure to the input signal (subjected to the first step of estimating unknown high-frequency components) to remove unnecessary low-frequency components and extract essential high-frequency components (step S304).

The estimated high-frequency components output from the second high-pass filter 1054 can be expressed as follows:

$$\hat{L}_r(x) = \overline{L_r}(x) - \sum_{i=-I}^{I} W(i) \cdot \overline{L_r}(x+i) \quad (7)$$

The term W(i) in the expression (7) is given from the expression (2). The expression (7) is also taught from the teaching of the document mentioned above.

The estimated high-frequency components output from the second high-pass filter 1054 is supplied as a high-frequency components frame 311 (FIG. 4) to the enhancement-layer encoder 106 (FIG. 1).

Known layered coding and decoding schemes with per-block coding and decoding procedures with per-block Laplacian-components emphasis have difficulty in analysis, such as estimation, and emphasis on block borders.

In contrast, the layered coding and decoding schemes in the embodiment disclosed above include reproduction of a base-layer decoded frame and interpolation of the decoded frame to an enhancement-layer frame scale followed by estimation of high-frequency components with Laplacian-components emphasis. The schemes give an interlayer predictive signal higher correlation with other interlayer predictive signals obtained in the vicinity of the signal in the time domain as the signal level is suppressed further, thus entropy being suppressed. This results in that coded data (bitstream) can carry fewer bits for higher efficient coding.

The several functions of the layered coding and decoding apparatuses 100 and 200 disclosed above with reference to FIGS. 1 to 5 can be achieved with software programs under the present invention.

Figure 6:
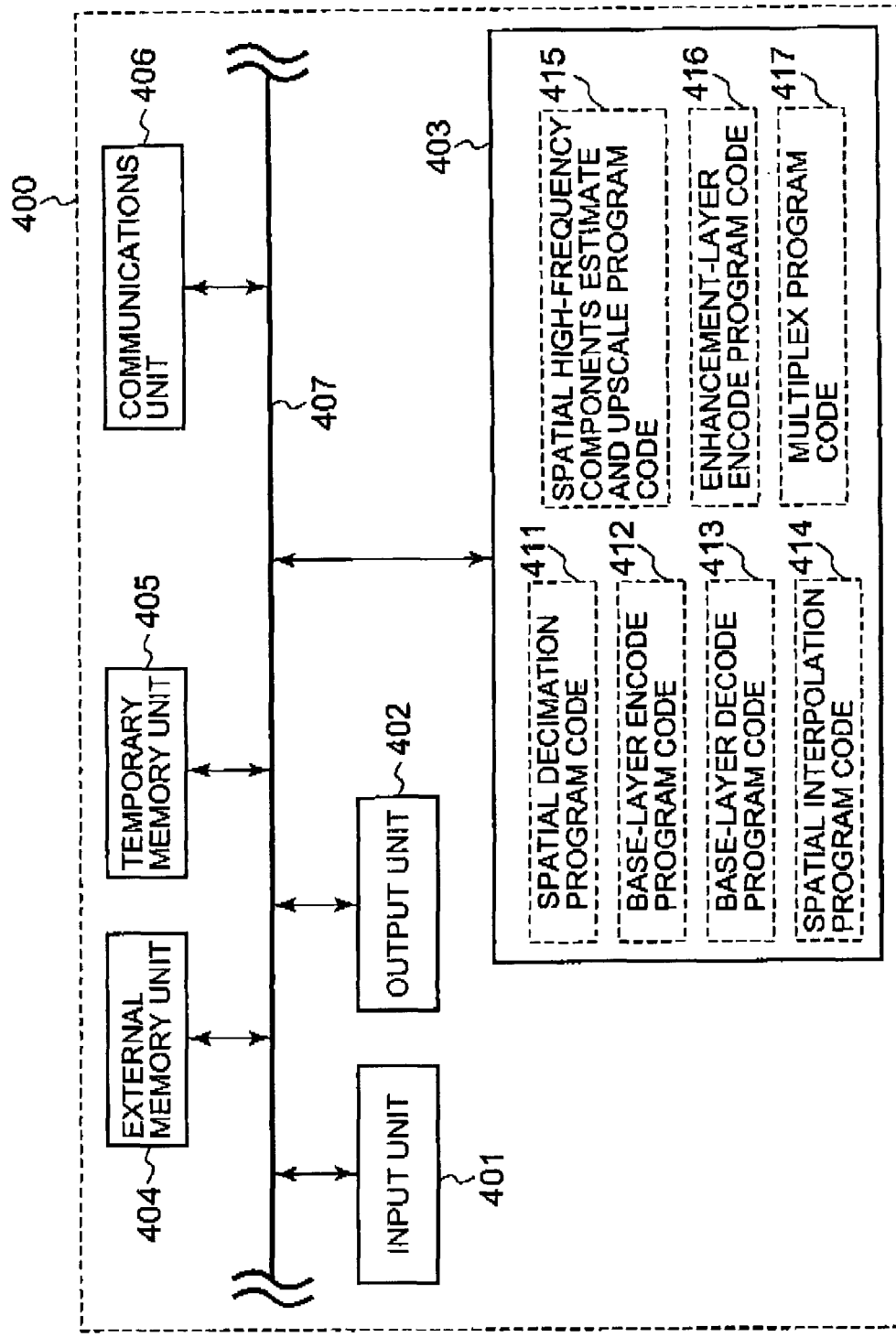
FIG. 6 shows a data processing system that executes a layered coding program according to the present invention.

FIG. 6 shows a data processing system 400 with a software program installed therein that corresponds to the functions of the layered coding apparatus 100 (FIG. 1).

The data processing system 400 is equipped with: an input unit 401 for entering several kinds of data; an output unit 402 for outputting several kinds of data; a central processing and controlling unit 403 with a layered coding program installed therein that corresponds to the functions of the layered coding apparatus 100; an external memory unit 404; a temporary memory unit 405 to be used, for example, as a working area in processing at the central processing and controlling unit 403; and a communications unit 406 for external communications. The units are connected to one another via a bidirectional bus 407.

Installed in the central processing and controlling unit 403 from a storage medium or via a communications network is a layered coding program that corresponds to the functions of the layered coding apparatus 100.

The layered coding program includes computer readable program codes, at least, a spatial decimation program code 411, a base-layer encode program code 412, a base-layer decode program code 413, a spatial interpolation program code 414, a spatial high-frequency components estimate and upscale program code 415, an enhancement-layer encode program code 416, and a multiplex program code 417.

The program codes 411, 412, 413, 414, 415, 416 and 417 correspond to the functions of the spatial decimator 101, the base-layer encoder 102, the base-layer decoder 103, the spatial interpolator 104, the spatial high-frequency components estimator and upscaler 105, the enhancement-layer encoder 106, and the multiplexer 107, respectively, shown in FIG. 1.

The central processing and controlling unit 403 works like the layered coding apparatus 100 while the layered coding program with the computer readable program codes listed above is running thereon.

Figure 7:
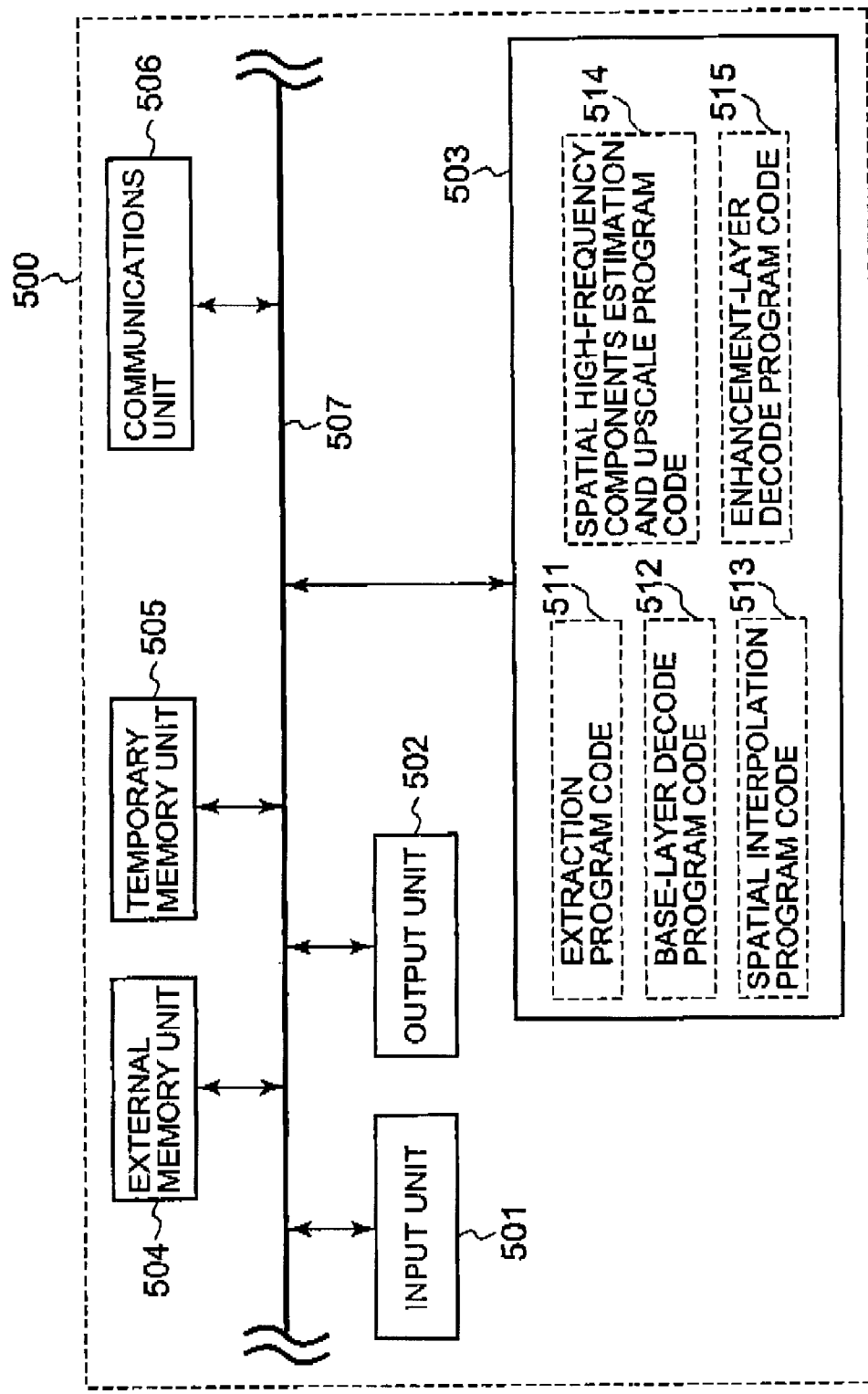
FIG. 7 shows a data processing system that executes a layered decoding program according to the present invention.

FIG. 7 shows a data processing system 500 with a software program installed therein that corresponds to the functions of the layered decoding apparatus 200 (FIG. 1).

The data processing system 500 is equipped with; an input unit 501 for entering several kinds of data; an output unit 502 for outputting several kinds of data; a central processing and controlling unit 503 with a layered decoding program installed therein that corresponds to the functions of the layered decoding apparatus 200; an external memory unit 504; a temporary memory unit 505 to be used, for example, as a working area in processing at the central processing and controlling unit 503; and a communications unit 506 for external communications. The units are connected to one another via a bidirectional bus 507.

Installed in the central processing and controlling units 503 from a storage medium or via a communications network is a layered decoding program that corresponds to the functions of the layered decoding apparatus 200.

The layered decoding program includes computer readable program codes, at least, an extraction program code 511, a base-layer decode program code 512, a spatial interpolation program code 513, a spatial high-frequency components esti-mation and upscale program code 514, and an enhancement-layer decode program code 515.

The program codes 511, 512, 513, 514, and 515 correspond to the functions of the extractor 201, the base-layer decoder 202, the spatial interpolator 203, the spatial high-frequency components estimator and upscaler 204, and the enhancement-layer decoder 205, respectively, shown in FIG. 1.

The central processing and controlling unit 503 works like the layered decoding apparatus 200 while the layered decoding program with the computer readable program codes listed above is running thereon.

The data processing systems 400 and 500 are compatible with each other, so that data processed at the system 400 can be transferred to the system 500 via media, such as, a storage medium, a transfer cable, a communications network, etc.

Disclosed so far are layered coding and decoding schemes for two coding layers of video frames or fields: an base layer and an enhancement layer (one layer higher than the base layer). Not only the two layers, however, the present invention is applicable to multilayers of video frames or fields.

Figure 8:
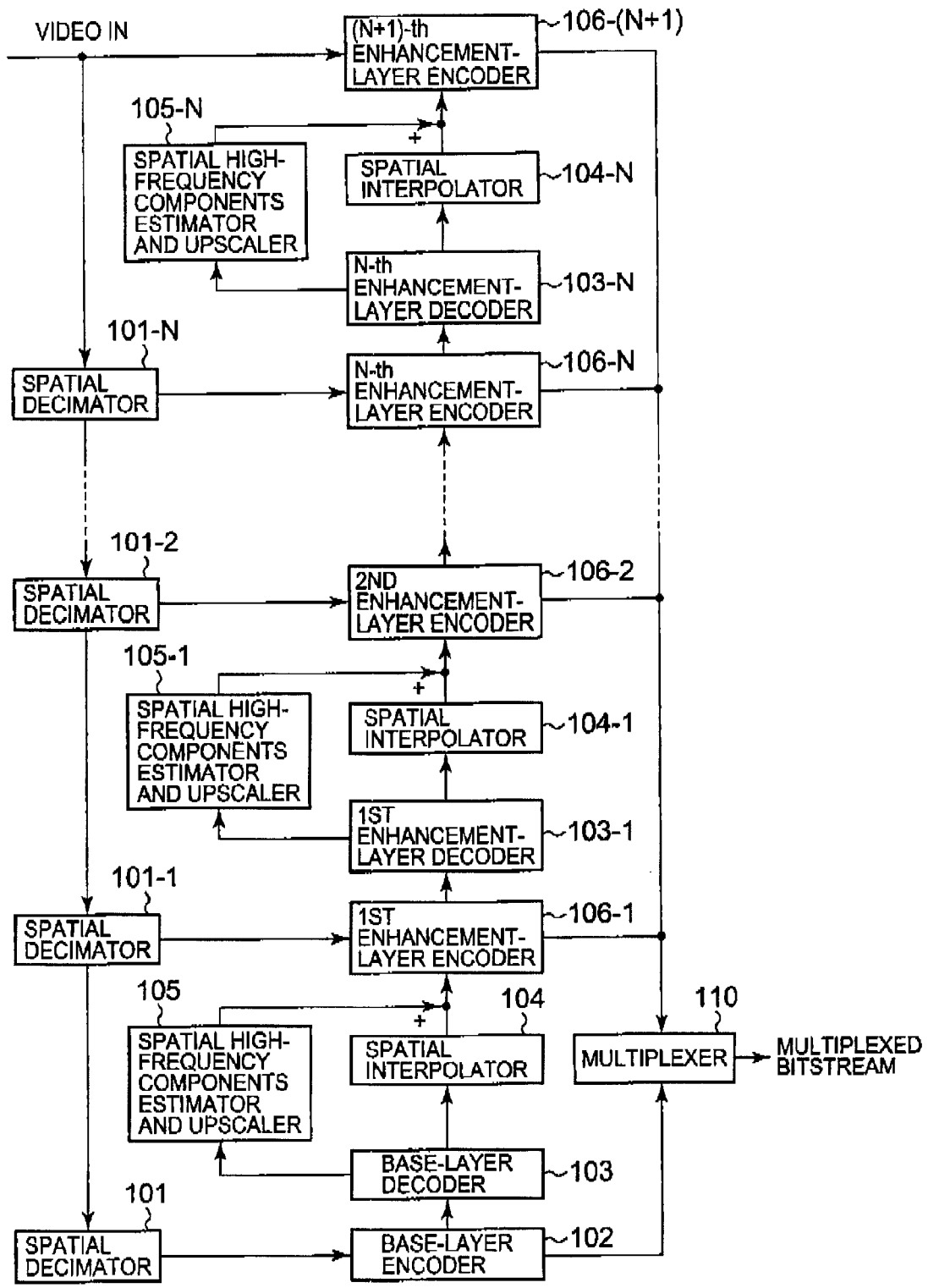
FIG. 8 shows a block diagram of a multilayer coding apparatus according to the present invention.

FIG. 8 shows a block diagram of a multilayer coding apparatus according to the present invention.

The same reference numerals are used for the components (FIG. 8) that are identical to those shown in FIG. 1.

The multilayer coding apparatus shown in FIG. 8 is an extended version of the layered coding apparatus 100 shown in FIG. 1. Provided in the apparatus of FIG. 8, instead of the enhancement-layer encoder 106 of FIG. 1, are: an N number of spatial decimators 101-1 to 101-N; the first enhancement-layer encoder 106-1 to the (N+1)-th enhancement-layer encoder 106-(N+1); the first enhancement-layer decoder 103-1 to the N-th enhancement-layer decoder 103-N; an N number of spatial interpolators 104-1 to 104-N; and an N number of spatial high-frequency components estimators and upscalers 105-1 to 105-N, N being a positive integer of one or more.

The first enhancement layer is one layer higher than the base layer. The second enhancement layer is one layer higher than the first enhancement layer. The same is true for the third or upper enhancement layer, or the (N+1)-th enhancement layer is one layer higher than the N-th enhancement layer.

Supplied to a multiplexer 110 in the multilayer coding apparatus (FIG. 8) are: a bitstream of a base-layer video frame coded at the base-layer encoder 102 after down-scaled at the spatial decimator 101; and also the bitstream from the first enhancement-layer encoder 106-1 to the (N+1)-th enhancement-layer encoder 106-(N+1).

The bitstream supplied from the first encoder 106-1 is an encoded predictive-error signal obtained based on correlation between; a first-enhancement-layer video frame signal gained by down scaling at the spatial decimator 101-1; and an upscaled video frame signal from the spatial interpolator 104 of the base layer one layer lower than the first enhancement layer and a high-frequency components signal from the spatial high-frequency components estimators and upscaler 105 of the base layer. The predictive-error signal is obtained by subtracting the upscaled video frame signal and the high-frequency components signal (given based on the signals of the base layer one layer lower than the first enhancement layer) from the first-enhancement-layer video frame signal (of the first enhancement layer).

Likewise, the bitstream supplied from the second enhancement-layer encoder 106-2 to the (N+1)-th enhancement-layer encoder 106-(N+1) are encoded predictive-error signals obtained based on correlation between: second to (N+1)-th enhancement-layer video frame signals; and upscaled video frame signals (from the spatial Interpolators 104-1 to 104-N of one layer lower than the layer of the corresponding enhancement-layer video frame signal) and also high-frequency components signals (from the spatial high-frequency components estimators and upscalers 105-1 to 105-N of one layer lower than the layer of the corresponding enhancement-layer video frame signal). Each predictive-error signal is obtained by subtracting the upscaled video frame signal and the high-frequency components signal (given based on the signals of the one-lower layer) from the corresponding enhancement-layer video frame signal.

Accordingly, the multiplexer 110 multiplexes the bitstream from the base-layer encoder 102 and an (N+1) number of bitstream, thus outputting the multiplexed bitstream. Here, the (N+1) number of bitstream are the predictive-error signals each obtained by subtracting the upscaled video frame signal and the high-frequency components signal (given based on the signals of a specific enhancement layer from among the first to N-th enhancement layers) from the enhancement-layer video frame signal (of another specific enhancement layer that is one layer higher than the former specific enhancement layer).

Figure 9:
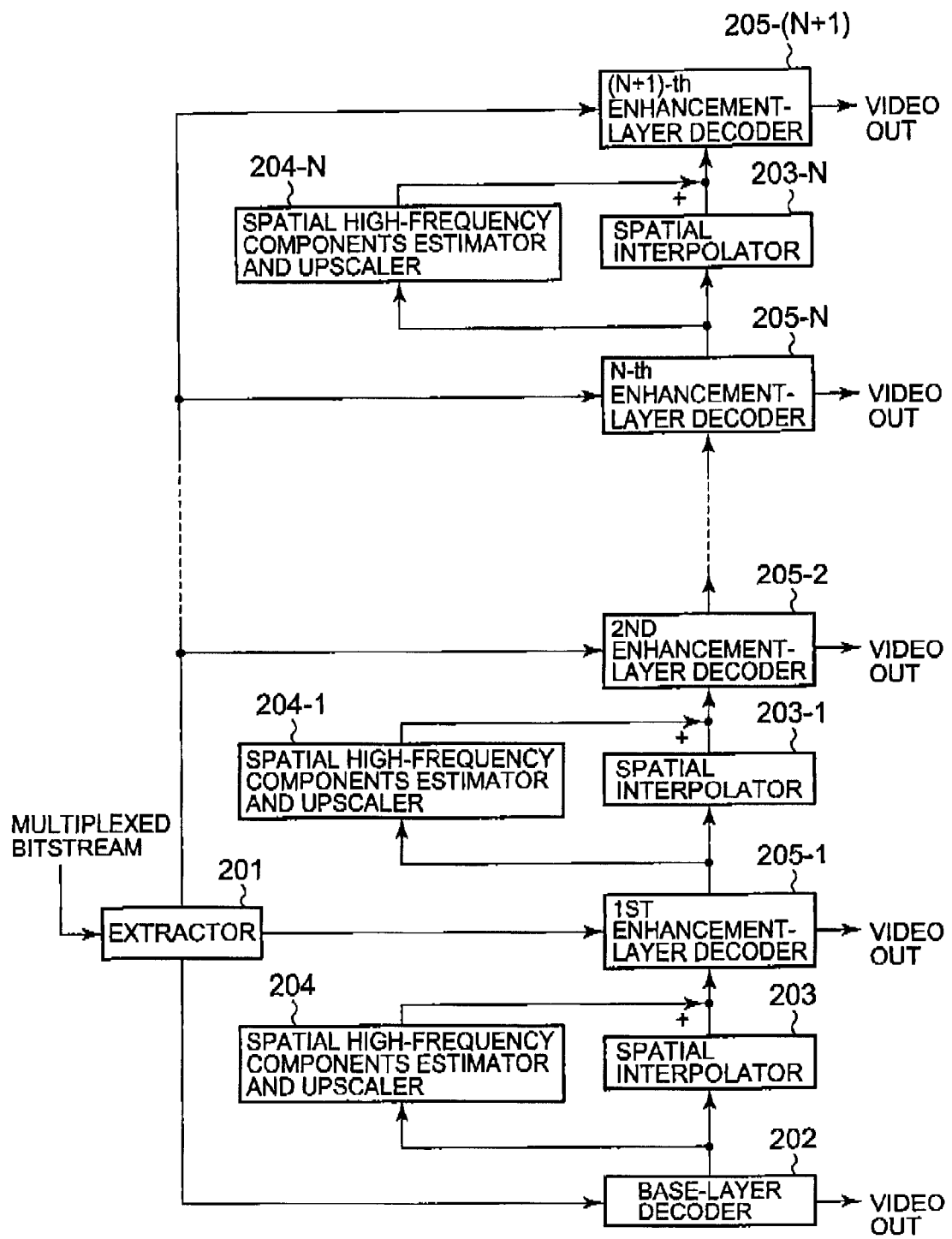
FIG. 9 shows a block diagram of a multilayer decoding apparatus according to the present invention.

FIG. 9 shows a block diagram of a multilayer decoding apparatus according to the present invention.

The same reference numerals are used for the components (FIG. 9) that are identical to those shown in FIG. 1.

The multilayer decoding apparatus shown in FIG. 9 is an extended version of the layered decoding apparatus 200 shown in FIG. 1. Provided in the apparatus of FIG. 9, instead of the enhancement-layer decoder 205 of FIG. 1, are: an (N+1) number of enhancement-layer decoders 205-1 to 205-(N+1); an N number of spatial interpolators 203-1 to 203-N; and an N number of spatial high-frequency components estimators and upscalers 204-1 to 204-N, N being a positive integer of one or more.

A multiplexed bitstream supplied, for example, from the multilayer coding apparatus (FIG. 8) is input to an extractor 201 in FIG. 9. The extractor 201 extracts a base-layer bitstream and the first to (N+1)-th enhancement-layer bitstream from the multiplexed bitstream.

The base-layer bitstream is decoded into a base-layer decoded output video signal at a base-layer decoder 202, like described with reference to FIG. 1.

The first to (N+1)-th enhancement-layer bitstream are supplied to the first to (N+1)-th enhancement-layer decoders 205-1 to 205-(N+1), respectively. Also supplied to the decoders 205-1 to 205-(N+1) are upscaled video frame signals gained by interpolation at the spatial interpolators 203 to 203-N, respectively, and high-frequency components signals gained by spatial high-frequency components estimation and upscaling at the spatial high-frequency components estimators and upscalers 204 to 204-N, respectively.

The first to (N+1)-th enhancement-layer decoders 205-1 to 205-(N+1) perform the reverse procedure of the encoding procedure at the first to (N+1)-th enhancement-layer encoders 106-1 to 106-(N+1) shown in FIG. 8. In detail, the decoders 205-1 to 205-(N+1) decode the bitstream at the first to (N+1)-th enhancement decoding layers, respectively, to gain predictive-error signals. The decoder 205-1 to 205-(N+1) add the respective upscaled video frame signals and high-frequency components signals to the corresponding predictive-error signals, thus reproducing video signals exhibiting the spatial resolution of the respective enhancement layers from among the first to (N+1)-th enhancement layers.

Accordingly, the base-layer decoder 202 and the first to (N+1)-th enhancement-layer decoders 205-1 to 205-(N+1) output video signals exhibiting the spatial resolution of the respective layers.

The number of layers is thus not limited to any particular number and easily extended as disclosed with respect to FIGS. 8 and 9, according to the present invention.

Moreover, in FIGS. 8 and 9, Laplacian components extracted from the base-layer decoded frame or the N-th enhancement-layer decoded frame in high-frequency components estimation promote elimination of high-frequency components with the subtraction procedure discussed in step S107 of FIG. 2, resulting in suppression of a signal level of an interlayer predictive signal for higher efficient coding.

In each embodiment disclosed above, the spatial high-frequency components estimator and upscaler performs level-limitation and constant-multiplication using a predetermined estimation and upscaling parameter at a given enhancement layer.

On the contrary, in each embodiment described below, an enhancement-layer encoder instructs a spatial high-frequency components estimator and upscaler to change estimation and upscaling parameters for use in estimation and upscaling and perform a spatial high-frequency components estimation and upscaling procedure with the changed parameters so that the encoder can generate the least amount of bitstream.

Figure 10:
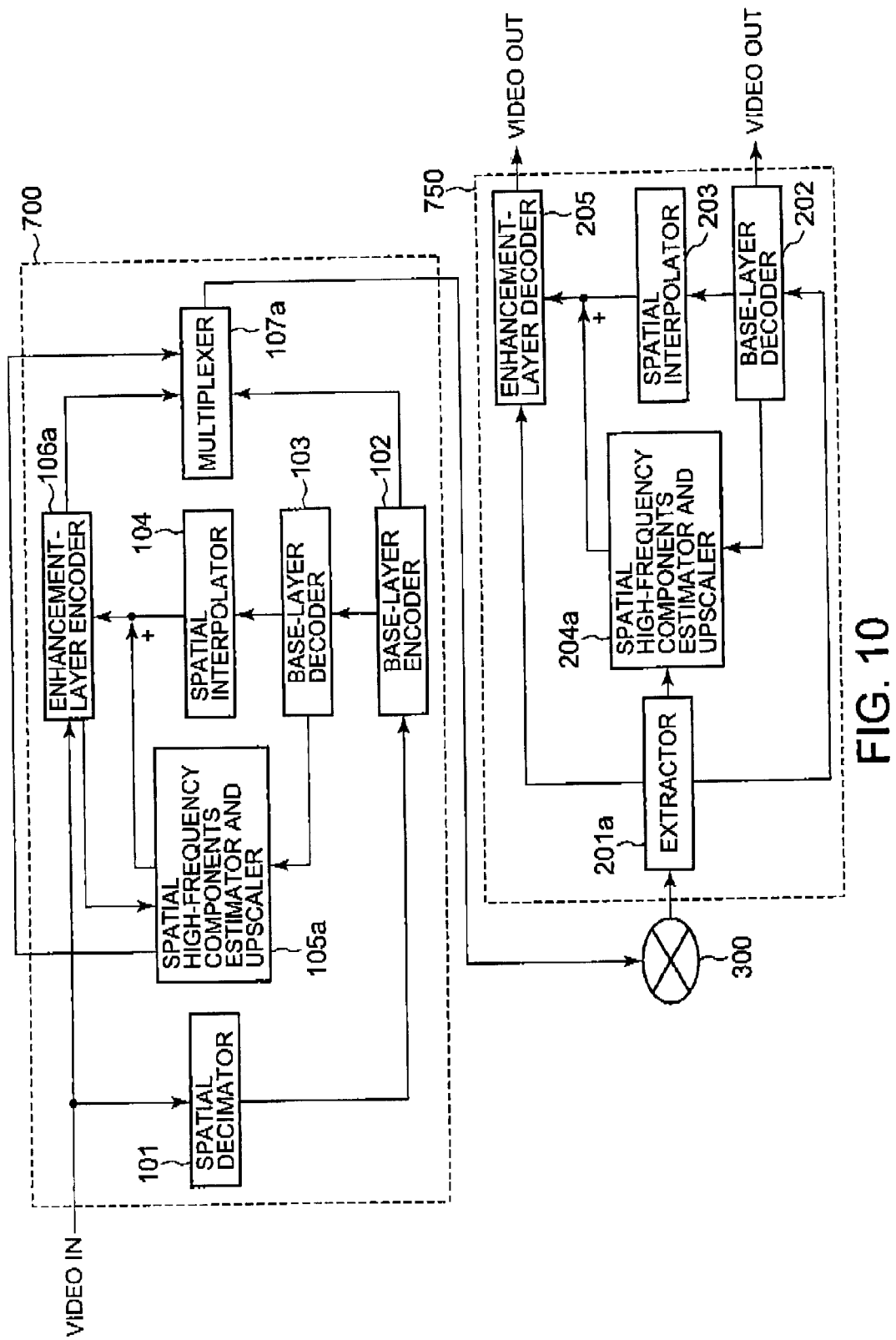
FIG. 10 shows block diagrams of a layered coding apparatus and a layered decoding apparatus according to the present invention.

Shown in FIG. 10 are block diagrams of a layered coding apparatus 700 and a layered decoding apparatus 750 according to the present invention. The units identical or analogous to those shown in FIG. 1 are given the same reference numerals, with the explanation thereof being omitted.

In FIG. 10, an enhancement-layer encoder 106a calculates a code amount when encoding a predictive-error signal at a spatial resolution of an enhancement layer. Like the counterpart 106 in FIG. 1, the encoder 106a obtains the predictive-error signal by subtracting an upscaled video (frame or field) signal from a spatial interpolator 104 and a high-frequency components (frame or field) signal from a spatial high-frequency components estimator and upscaler 105a from an input enhancement-layer video (frame or field) signal.

Although not shown in FIG. 10, the enhancement-layer encoder 106a includes an orthogonal transformer, a quantizater, an entropy encoder, etc. Therefore, the code amount to be calculated by the encoder 106a may be a code amount generated after the predictive-error signal mentioned above is subjected to orthogonal transformation and quantization or a code amount generated after the predictive-error signal is subjected to orthogonal transformation and quantization, and also entropy encoding. The latter code amount is closer to the code amount of the output bitstream of the encoder 106a than the former code amount is. Nevertheless, the latter requires more calculation than the former.

The enhancement-layer encoder 106a sends a reprocessing command, based on the code amount discussed above, to the spatial high-frequency components estimator and upscaler 105a to change the estimation and upscaling parameters and perform again the spatial high-frequency components estimation and upscaling procedure. The reprocessing command may be generated for the spatial high-frequency components estimation and upscaling procedure to be performed several times, such as, three or four times. It may also be generated when a currently calculated code amount is smaller than a preset value or a code amount calculated just before the current code amount.

With the high-frequency components signals generated again or several times from the spatial high-frequency components estimator and upscaler 105 and an upscaled video signal from the spatial interpolator 104, the enhancement-layer encoder 106a calculates code amounts of predictive-error signals coded in accordance with the high-frequency components signals generated again or several times and supplies a bitstream of the least code amount to a multiplexer 107a.

Figure 11:
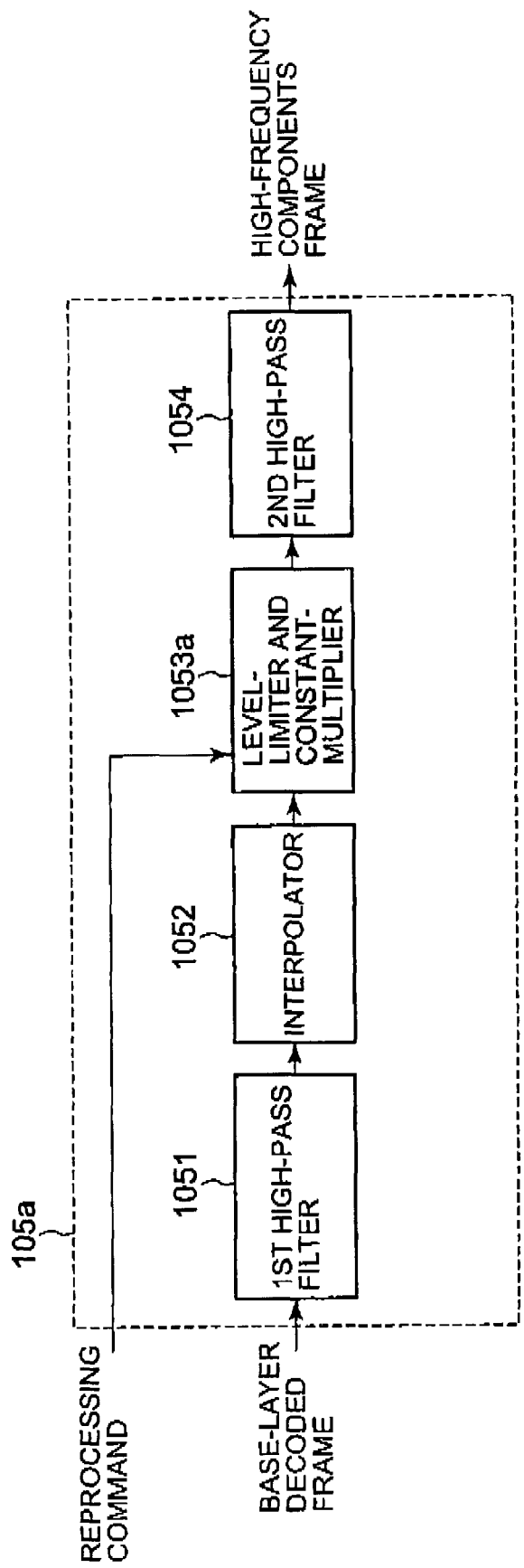
FIG. 11 shows a block diagram of a spatial high-frequency components estimator and upscaler of the layered coding apparatus shown in FIG. 10.

FIG. 11 shows an exemplary block diagram of the spatial high-frequency components estimator and upscaler 105a. The units identical or analogous to those shown in FIG. 4 are given the same reference numerals, with the explanation thereof being omitted.

In FIG. 11, when the reprocessing command is sent from the enhancement-layer encoder 106a, a level-limiter and constant-multiplier 1053a changes the estimation and upscaling parameters and performs again or several times the spatial high-frequency components estimation and upscaling procedure.

In detail, in response to the reprocessing command, the level-limiter and constant-multiplier 1053a changes the parameter T for estimation and upscaling and the parameter $\alpha_r$ for constant-multiplication, both shown in the expression (6). These two parameters are referred to as the estimation and upscaling parameters mentioned above. Then, the level-limiter and constant-multiplier 1053a performs again or several times a level-limitation and constant-multiplication procedure with the changed parameters, the output being sent to a second high-pass filter 1054.

The level-limiter and constant-multiplier 1053a may pre-store several sets of the parameter T for estimation and upscaling and the parameter or for constant-multiplication, shown in the expression (6), or may change these parameters by a given value in response to the reprocessing command.

When the level-limiter and constant-multiplier 1053a has changed the estimation and upscaling parameters and performed the level-limitation and constant-multiplication procedure again, the enhancement-layer encoder 106a performs the encoding procedure and calculates code amounts, in accordance with the number of the level-limitation and constant-multiplication procedure performed, to find out the least code amount. The encoder 106a sends a command regarding the least coded amount to the spatial high-frequency components estimator and upscaler 105a. In respond to the command, the estimator and upscaler 105a sends the estimation and upscaling parameters for the least code amount to the multiplexer 107a. The parameters may be sent to the multiplexer 107a after subjected to entropy coding or the like.

The multiplexer 107a receives the bitstream of the least code amount from the enhancement-layer encoder 106a and the estimation and upscaling parameters for the least code amount from the spatial high-frequency components estimator and upscaler 105a. Then the multiplexer 107a multiplexes the bitstream and parameters into a multiplexed bitstream which can be supplied to the layered decoding apparatus 750 via a transfer cable or other media 300.

As disclosed above, according to the layered coding apparatus 700 shown in FIG. 10, the enhancement-layer encoder 106a generates a bitstream of a smaller code amount and hence the multiplexer 107a outputs a multiplexed bitstream at a higher transfer rate.

Then, in FIG. 10, the layered decoding apparatus 750 receives the multiplexed bitstream via the transfer cable or other media 300. Nevertheless, the apparatus 750 can receive bitstream not only from the layered coding apparatus 700 but also from any source.

An extractor 201a receives the multiplexed bitstream and demultiplexes it into the base-layer bitstream, the enhancement-layer bitstream, and the estimation and upscaling parameters, which are supplied to a base-layer decoder 202, an enhancement-layer decoder 205, and a spatial high-frequency components estimator and upscaler 204a, respectively. The estimation and upscaling parameters are decoded if encoded by entropy coding or the like.

Figure 12:
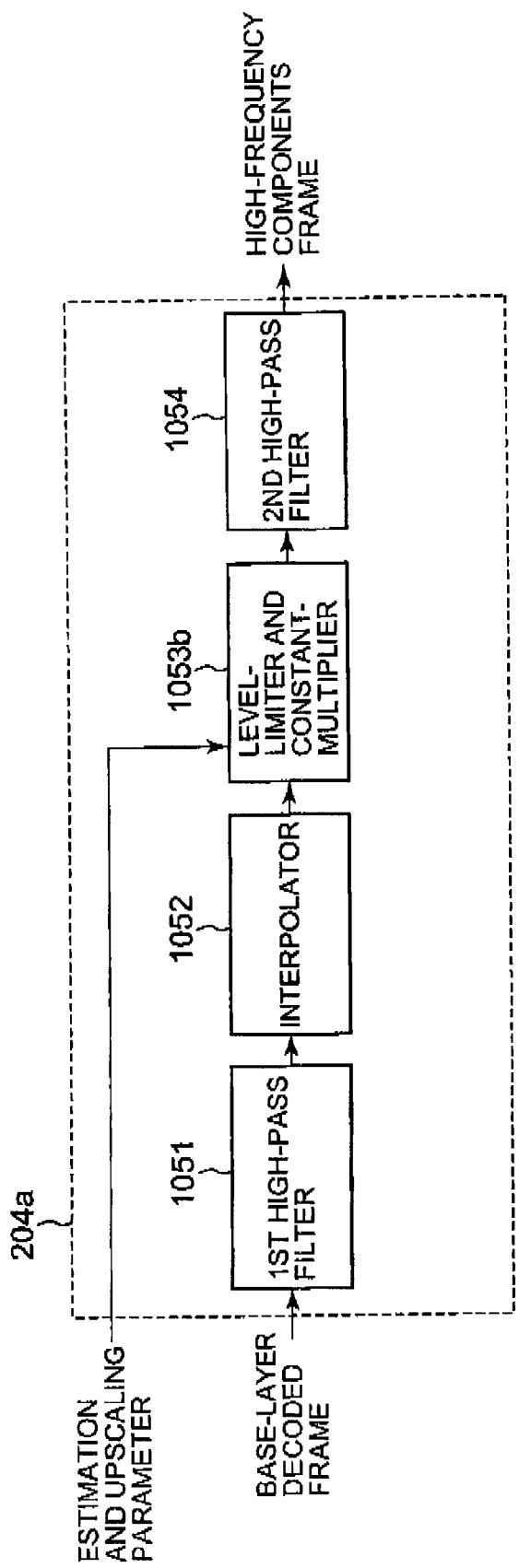
FIG. 12 shows a block diagram of a spatial high frequency components estimator and upscaler of the layered decoding apparatus shown in FIG. 10.

FIG. 12 shows an exemplary block diagram of the spatial high-frequency components estimator and upscaler 204a. The units identical or analogous to those shown in FIG. 4 are given the same reference numerals, with the explanation thereof being omitted.

In FIG. 12, the estimation and upscaling parameters are sent to a level-limiter and constant-multiplier 1053b from the extractor 201a.

The label "ESTIMATION AND UPSCALING PARAMETER" in FIG. 12 indicates both of the parameter T for estimation and upscaling and the parameter $\alpha_r$ for constant-multiplication, shown in the expression (6).

The level-limiter and constant-multiplier 1053b performs a spatial high-frequency components estimation and upscaling procedure, with estimation and upscaling parameters, to a base-layer decoded video (frame or field) signal, or a locally decoded signal supplied from the base-layer decoder 202, thus generating a high-frequency components (frame or filed) signal which is supplied to the enhancement-layer decoder 205.

The enhancement-layer decoder 205 decodes an enhancement-layer bitstream supplied from the extractor 201a to gain a predictive-error signal. Then, the decoder 205 adds the predictive-error signal, and an upscaled video (frame or field) signal from a spatial interpolator 203 and the high-frequency components (frame or filed) signal from the high-frequency components estimator and upscaler 204a, thus reproducing an enhancement-layer video signal.

As disclosed above, when an input enhancement-layer bitstream is multiplexed with the estimation and upscaling parameters, in the layered decoding apparatus 750, the enhancement-layer decoder 205 decodes the input enhancement-layer bitstream through the high-frequency components estimation and upscaling procedure at the high-frequency components estimator and upscaler 204a to a signal decoded at the base-layer decoder 202, using the estimation and upscaling parameters. Thus, the layered decoding apparatus 750 accurately decodes a bitstream supplied from the layered decoding apparatus 700.

In the embodiment shown in FIG. 10, the multiplexer 107a multiplexes the enhancement-layer bitstream from the enhancement-layer encoder 106a with the estimation and upscaling parameters from the spatial high-frequency components estimator and upscaler 105a, thus generating the multiplexed bitstream.

Not only that, the enhancement-layer encoder 106a may supply the estimation and upscaling parameters to the spatial high-frequency components estimator and upscaler 105a and also multiplex the enhancement-layer bitstream with the parameters into the output multiplexed bitstream.

As disclosed above, the embodiment in FIG. 10 includes the layered coding apparatus 700 and the layered decoding apparatus 750 which ate two-layer apparatuses (the enhancement layer and the base layer), for encoding and decoding using the estimation and upscaling parameters for the least code amount of bitstream.

Disclosed below are multilayer coding and decoding apparatuses for encoding and decoding using the estimation and upscaling parameters for the least coded amount of bitstream.

Figure 13:
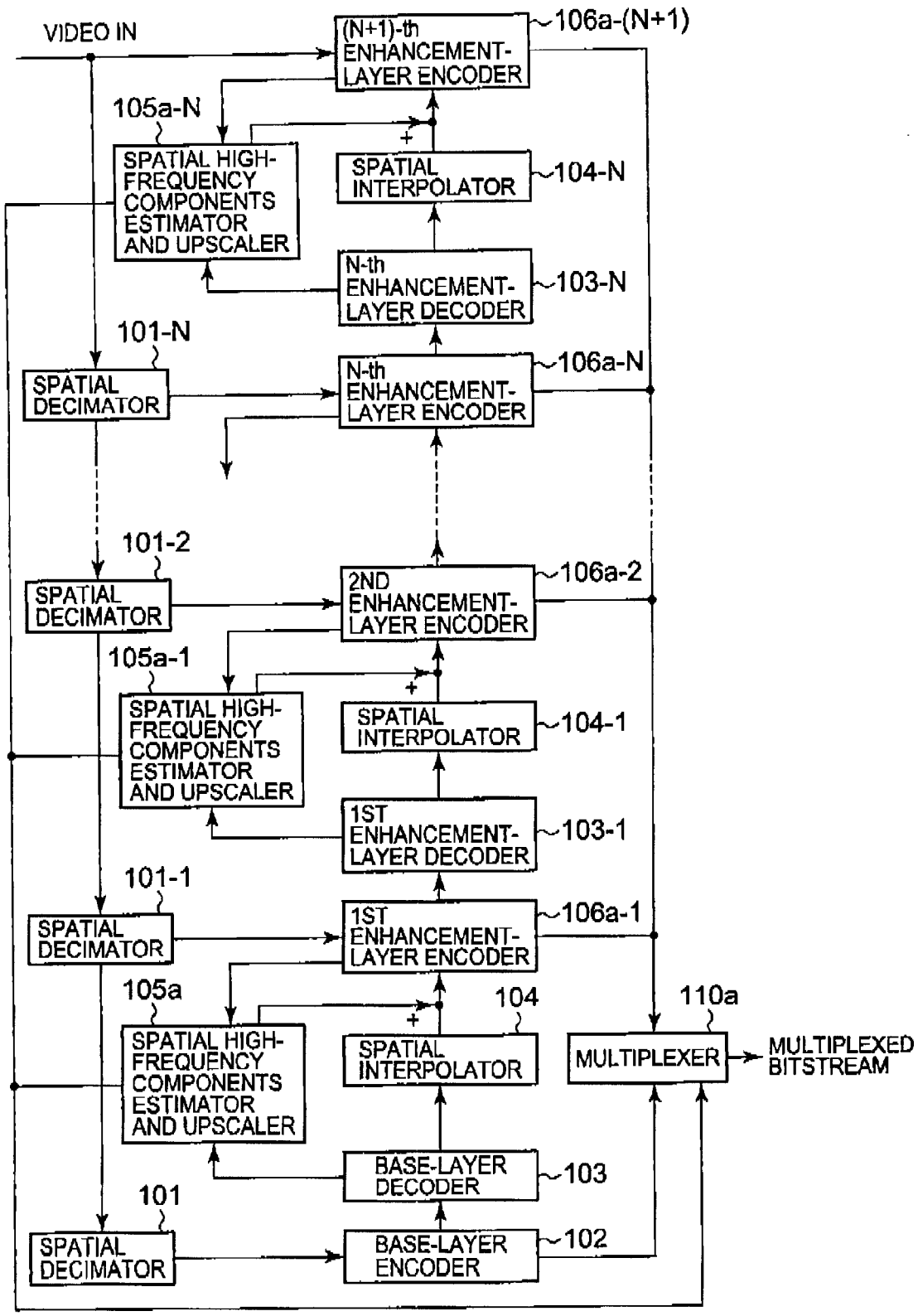
FIG. 13 shows a block diagram of a multilayer coding apparatus according to the present invention.

FIG. 13 shows a block diagram of a multilayer coding apparatus 800 according to the present invention. The units identical or analogous to those shown in FIG. 8 are given the same reference numerals, with the explanation thereof being omitted.

Like the enhancement-layer encoder 106a in FIG. 10, first- to (N+1)-th enhancement-layer encoders 106a-1 to 106a-(N+1) calculate code amounts and send reprocessing commands to spatial high-frequency components estimators and upscalers 105a to 105a-N, respectively.

In response to the reprocessing commands, the spatial high-frequency components estimators and upscalers 105a to 105a-N change the estimation and upscaling parameters and perform the spatial high-frequency components estimation and upscaling procedure again or several times to generate high-frequency components signals which are supplied to the enhancement-layer encoders 106a-1 to 106a-(N+1), respectively.

Each of the spatial high-frequency components estimator and upscaler 105a to 105a-N has the same structure as shown in FIG. 11.

Each of the first- to (N+1)-th enhancement-layer encoders 106a-1 to 106a-(N+1) supplies the bitstream of the least code amount to a multiplexer 110a, through plural times of the high-frequency components estimation and upscaling procedure. Each of the spatial high-frequency components estimator and upscaler 105a to 105a-N supplies the estimation and upscaling parameters for the least code amount to the multiplexer 110a. The multiplexer 110a multiplexes first- to (N+1)-th enhancement-layer bitstream with the corresponding parameters, thus generating an output multiplexed bitstream. The parameters may be sent to the multiplexer 110a after subjected to entropy coding or the like.

Figure 14:
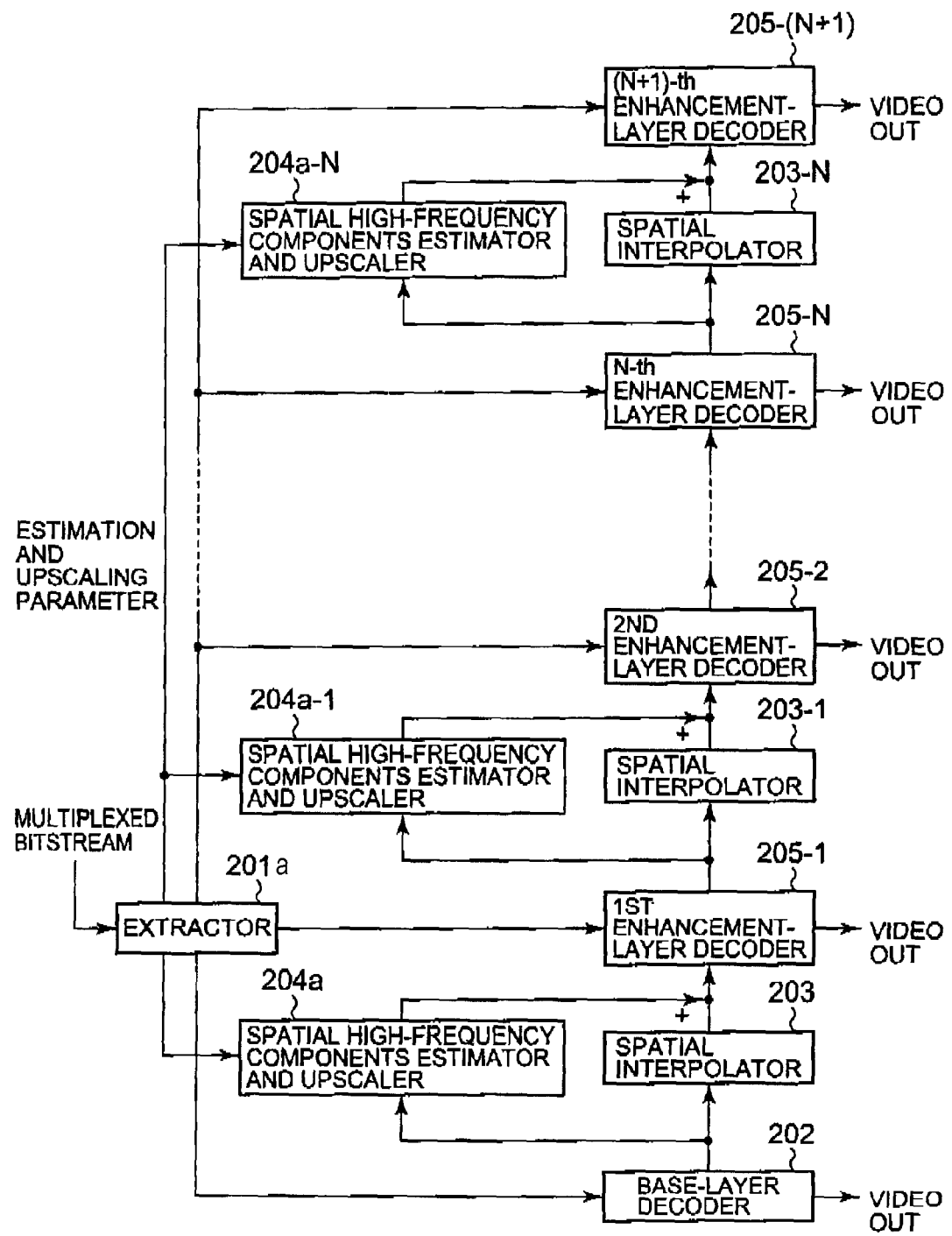
FIG. 14 shows a block diagram of a multilayer decoding apparatus according to the present invention.

FIG. 14 shows a block diagram of a multilayer decoding apparatus 850 according to the present invention. The units identical or analogous to those shown in FIG. 9 are given the same reference numerals, with the explanation thereof being omitted.

The layered decoding apparatus 850 receives the multiplexed bitstream supplied from the layered coding apparatus 800. Nevertheless, the apparatus 850 can receive bitstream not only from the layered coding apparatus 800 but also from any source.

An extractor 201a receives the multiplexed bitstream and demultiplexes it into the base-layer bitstream, the first- to (N+1)-th enhancement-layer bitstream, and the estimation and upscaling parameters, which are supplied to a base-layer decoder 202, first- to N-th enhancement-layer decoders 205-1 to 205-N, and spatial high-frequency components estimators and upscalers 204a to 204a-N, respectively. The estimation and upscaling parameters are decoded if encoded by entropy coding or the like.

The spatial high-frequency components estimators and upscalers 204a to 204a-N perform a high-frequency components estimation and upscaling procedure to decoded video (frame or field) signals, or locally decoded signals, supplied from a base-layer decoder 202, and first to N-the enhancement-layer decoders 205-1 to 20-5N, respectively, thus generating high-frequency components (frame or filed) signals. The generated high-frequency components (frame or filed) signals are supplied to the enhancement-layer decoders 205-1 to 205-N.

Each of the spatial high-frequency components estimators and upscalers 204a to 204a-N has the same structure as shown in FIG. 12.

The first to (N+1)-th enhancement-layer decoders 205-1 to 205-(N+1) decode first to (N+1)-th enhancement-layer bitstream, respectively, supplied from the extractor 201b, to gain predictive-error signals. Then, the decoders 205-1 to 205-(N+1) add the predictive-error signals, and upscaled video (frame or field) signals from spatial interpolators 203 to 203-N and the high-frequency components (frame or filed) signals from the high-frequency components estimators and upscalers 204a to 204a-N, thus reproducing first to (N+1)-th enhancement-layer video signals, respectively.

As disclosed above, according to the multilayer coding apparatus 800 shown in FIG. 13, the enhancement-layer encoders 106a-1 to 106a-(N+1) generate bitstream of a smaller coded amount and hence the multiplexer 110a outputs a multiplexed bitstream at a higher transfer rate. And, the multilayer decoding apparatus 850 shown in FIG. 14 can accurately decode such a multiplexed bitstream.

According to the several embodiments disclosed above, the encoding procedure is performed at one enhancement layer or all of a plurality of enhancement layers, besides the base layer that is the lowest layer with the lowest spatial resolution.

In detail, the encoding procedure is performed to a predictive-error signal obtained by subtracting an upscaled decoded video signal and a high-frequency components signal from an input video signal exhibiting a spatial resolution of the one enhancement layer or each of the enhancement layers mentioned above.

Here, the upscaled decoded video signal is obtained by scaling up a decoded signal of one layer lower than the one enhancement layer or each of the enhancement layers, as exhibiting the spatial resolution of the one enhancement layer or each of the enhancement layers. The high-frequency components signal is obtained by estimation and scaling up high-frequency components at the spatial resolution of the one enhancement layer or each of the enhancement layers.

Not only that, according to the present invention, the encoding procedure can be performed at any enhancement layer of a plurality of enhancement layers. In addition, the decoded signal to be subjected to the upscaling procedure is not only a signal decoded at one layer lower than the one enhancement layer or each of the enhancement layers but also decoded at two or more layers lower than the one enhancement layer or each of the enhancement layers.

The several embodiments disclosed above employ a moving-picture signal as a signal to be encoded. Not only that, however, a still-picture signal may also be employed as a signal to be encoded, which is compressed with spatial correlation.

As disclosed above in detail, according to the layered coding and decoding schemes according to the present invention, high-frequency components generated, mostly, in a zone in a video frame, such as, a strong edge zone, are eliminated before the coding procedure. Such high-frequency components can be estimated from a base layer based on correlation between the base layer and an enhancement layer (one layer higher than the base layer) of a video frame or field. Or, they can be estimated from an (N−1)-th enhancement layer based on correlation between the (N−1)-th enhancement layer and an N-th enhancement layer (one layer higher than the (N−1)-th layer) of a video frame or field.

Elimination of the high-frequency components results in suppression of a signal level of or data amount carried by an interlayer predictive signal. The interlayer predictive signal exhibits higher correlation with other interlayer predictive signals obtained in the vicinity of the signal in the time domain as the signal level is suppressed further. Therefore, entropy is suppressed, and hence, coded data carry fewer bits. In addition, the suppressed interlayer predictive signal level diminishes adverse effects to decoding due to quantization errors.

What is claimed is:

1. A layered coding apparatus for encoding an input video signal at a plurality of coding layers exhibiting different spatial resolutions comprising:

a decoder to decode a given signal coded at a lower coding layer lower than a specific coding layer among the plurality of coding layers, thus generating a decoded signal of the lower coding layer;

a spatial interpolator to apply spatial interpolation to the decoded signal of the lower coding layer, thus generating an upscaled decoded video signal, the spatial interpolation being an upscaling procedure to upscale the decoded signal of the lower coding layer into a spatial resolution of the specific coding layer;

a spatial high-frequency components estimator and upscaler to apply a spatial high-frequency components estimation and scale up procedure to the decoded signal of the lower coding layer, thus generating a high-frequency components signal; and an encoder to subtract the upscaled decoded video signal and the high-frequency components signal from the input video signal exhibiting a spatial resolution of the specific coding layer to produce a predictive-error signal, and encode the predictive-error signal at the specific coding layer, thus generating an output bitstream, wherein the decoder, the spatial interpolator, the spatial high-frequency components estimator and upscaler, and the encoder function at, at least, the specific coding layer among the plurality of coding layers except the lowest coding layer exhibiting the lowest spatial resolution thereamong.

2. The layered coding apparatus according to claim 1, wherein the encoder calculates a code amount of the predictive-error signal thus encoded at the specific coding layer and makes the spatial high-frequency components estimator and upscaler, based on the code amount, change estimation and upscaling parameters for use in estimation and upscaling, and perform, at least once again, the spatial high-frequency components estimation and upscaling procedure, and based on the spatial high-frequency components estimation and upscaling procedure performed at least once again, the encoder calculates the code amount at least once again and generates an output bitstream having the least code amount among code amounts thus calculated, and the spatial high-frequency components estimator and upscaler outputs estimation and upscaling parameters for the least code amount, wherein the layered coding apparatus further comprises a multiplexer to multiplex the bitstream having the least code amount and the estimation and upscaling parameters for the least code amount.

3. The layered coding apparatus according to claim 1, wherein the coding layers are two coding layers, the specific coding layer being an enhancement layer, and the lower coding layer being a base layer lower than the enhancement layer and exhibiting a spatial resolution lower than the spatial resolution of the enhancement layer.

4. The layered coding apparatus according to claim 1, wherein the coding layers are at least three coding layers, the specific coding layer including at least two enhancement layers exhibiting different spatial resolutions, and the lower coding layer being a base layer lower than the two enhancement layers and exhibiting a spatial resolution lower than the spatial resolutions of the two enhancement layers.

5. A layered decoding apparatus for decoding an input bitstream comprising:

a spatial interpolator to apply spatial interpolation to a given signal decoded at a lower decoding layer lower than a specific decoding layer, thus generating an upscaled decoded video signal, the spatial interpolation being an upscaling procedure to upscale the given decoded signal into a spatial resolution of the specific decoding layer;

a spatial high-frequency components estimator and upscaler to apply a spatial high-frequency components estimation and scale up procedure to the given decoded signal at the lower decoding layer, thus generating a high-frequency components signal; and a decoder to decode the input bitstream to obtain a predictive error-signal and add the upscaled decoded video signal and the high-frequency components signal to the predictive-error signal, thus generating a reproduced video signal, wherein the spatial interpolator, the spatial high-frequency components estimator and upscaler, and the decoder function at the specific decoding layer that corresponds to at least one specific coding layer among a plurality of coding layers exhibiting different spatial resolutions except the lowest coding layer exhibiting the lowest spatial resolution thereamong, wherein the input bitstream has been obtained by encoding a predictive-error signal at, at least, the specific coding layer, the predictive-error signal being obtained by subtracting an upscaled decoded video signal and a high-frequency components signal from a video signal exhibiting a spatial resolution of the specific coding layer, the upscaled decoded video signal having been obtained by applying spatial interpolation to a signal decoded at a lower coding layer lower than the specific coding layer, the spatial interpolation being an upscaling procedure to upscale the signal decoded at the lower coding layer into a spatial resolution of the specific coding layer, and the high-frequency components signal having been obtained by applying a spatial high-frequency components estimation and scale up procedure to the signal decoded at the lower coding layer.

6. The layered decoding apparatus according to claim 5 further comprising an extractor to demultiplex" the input bitstream per decoding layer and extract estimation and upscaling parameters for use in estimation and upscaling from the input bitstream, wherein the spatial high-frequency components estimator and upsealer applies the spatial high-frequency components estimation and scale up procedure to the given decoded signal at the lower decoding layer, based on the estimation and upscaling parameters, thus generating the high-frequency components signal.

7. A layered coding method of encoding an input video signal at a plurality of coding layers exhibiting different spatial resolutions comprising the steps of:

a decoding step of decoding a given signal coded at a lower coding layer lower than a specific coding layer among the plurality of coding layers, thus generating a decoded signal of the lower coding layer;

a spatial interpolating step of applying spatial interpolation to the decoded signal of the lower coding layer, thus generating an upscaled decoded video signal, the spatial interpolation being an upscaling procedure to upscale the decoded signal of the lower coding layer into a spatial resolution of the specific coding layer;

a spatial high-frequency components estimating and upscaling step of applying a spatial high-frequency components estimation and scale up procedure to the decoded signal of the lower coding layer, thus generating a high-frequency components signal; and an encoding step of subtracting the upscaled decoded video signal and the high-frequency components signal from the input video signal exhibiting a spatial resolution of the specific coding layer to, produce a predictive-error signal, and encoding the predictive-error signal at the specific coding layer, thus generating an output bitstream, wherein the decoding step, the spatial interpolating step, the spatial high-frequency components estimating and upscaling step, and the encoding step are executed at, at least, the specific coding layer among the plurality of coding layers except the lowest coding layer exhibiting the lowest spatial resolution thereamong.

8. A layered decoding method of decoding an input bitstream comprising the steps of:
- a spatial interpolating step of applying spatial interpolation to a given signal decoded at a lower decoding layer lower than a specific decoding layer, thus generating an upscaled decoded video signal, the spatial interpolation being an upscaling procedure to upscale the given decoded signal into a spatial resolution of the specific decoding layer;
- a spatial high-frequency components estimating and upscaling step of applying a spatial high-frequency components estimation and scale up procedure to the given decoded signal at the lower decoding layer, thus generating a high-frequency components signal; and
- a decoding step of decoding the input bitstream to obtain a predictive error-signal and adding the upscaled decoded video signal and the high-frequency components signal to the predictive-error signal, thus generating a reproduced video signal, wherein the spatial interpolating step, the spatial high-frequency components estimating and upscaling step, and the decoding step are executed at the specific decoding layer that corresponds to at least one specific coding layer among a plurality of coding layers exhibiting different spatial resolutions except the lowest coding layer exhibiting the lowest spatial resolution thereamong, wherein the input bitstream has been obtained by encoding a predictive-error signal at, at least, the specific coding layer, the predictive-error signal being obtained by subtracting an upscaled decoded video signal and a high-frequency components signal from a video signal exhibiting a spatial resolution of the specific coding layer, the upscaled decoded video signal having been obtained by applying spatial interpolation to a signal decoded at a lower coding layer lower than the specific coding layer, the spatial interpolation being an upscaling procedure to upscale the signal decoded at the lower coding layer into a spatial resolution of the specific coding layer, and the high-frequency components signal having been obtained by applying a spatial high-frequency components estimation and scale up procedure to the signal decoded at the lower coding layer.

9. A layered coding program in a non-transitory computer readable medium for encoding an input video signal at a plurality of coding layers exhibiting different spatial resolutions, comprising:
- a decoding program code to decode a given signal coded at a lower coding layer lower than a specific coding layer among the plurality of coding layers, thus generating a decoded signal of the lower coding layer;
- a spatial interpolating program code to apply spatial interpolation to the decoded signal of the lower coding layer, thus generating an upscaled decoded video signal, the spatial interpolation being an upscaling procedure to upscale the decoded signal of the lower coding layer into a spatial resolution of the specific coding layer;
- a spatial high-frequency components estimating and upscaling program code to apply a spatial high-frequency components estimation and scale up procedure to the decoded signal of the lower coding layer, thus generating a high-frequency components signal; and
- an encoding program code to subtract the upscaled decoded video signal and the high-frequency components signal from the input video signal exhibiting a spatial resolution of the specific coding layer to produce a predictive-error signal, and encode the predictive-error signal at the specific coding layer, thus generating an output bitstream, wherein the decoding program code, the spatial interpolating program code, the spatial high-frequency components estimating and upscaling program code, and the encoding program code are executed at, at least, the specific coding layer among the plurality of coding layers except the lowest coding layer exhibiting the lowest spatial resolution thereamong.

10. A layered decoding program in a non-transitory computer readable medium for decoding an input bitstream comprising:
- a spatial interpolating program code to apply spatial interpolation to a given signal decoded at a lower decoding layer lower than a specific decoding layer, thus generating an upscaled decoded video signal, the spatial interpolation being an upscaling procedure to upscale the given decoded signal into a spatial resolution of the specific decoding layer;
- a spatial high-frequency components estimating and upscaling program code to apply a spatial high-frequency components estimation and scale up procedure to the given decoded signal at the lower decoding layer, thus generating a high-frequency components signal; and
- a decoding program code to decode the input bitstream to obtain a predictive error-signal and adding the upscaled decoded video signal and the high-frequency components signal to the predictive-error signal, thus generating a reproduced video signal, wherein the spatial interpolating program code, the spatial high-frequency components estimating and upscaling program code, and the decoding program code are executed at the specific decoding layer that corresponds to at least one specific coding layer among a plurality of coding layers exhibiting different spatial resolutions except the lowest coding layer exhibiting the lowest spatial resolution thereamong, wherein the input bitstream has been obtained by encoding a predictive-error signal at, at least, the specific coding layer, the predictive-error signal being obtained by subtracting an upscaled decoded video signal and a high-frequency components signal from a video signal exhibiting a spatial resolution of the specific coding layer, the upscaled decoded video signal having been obtained by applying spatial interpolation to a signal decoded at a lower coding layer lower than the specific coding layer, the spatial interpolation being an upscaling procedure to upscale the signal decoded at the lower coding layer into a spatial resolution of the specific coding layer, and the high-frequency components signal having been obtained by applying a spatial high-frequency components estimation and scale up procedure to the signal decoded at the lower coding layer.

* * * * *